United States Patent
Kraft

(10) Patent No.: US 8,863,519 B2
(45) Date of Patent: Oct. 21, 2014

(54) HIGH OUTPUT MODULAR CAES (HOMC)

(75) Inventor: Robert J. Kraft, Tequesta, FL (US)

(73) Assignee: PowerPHASE LLC, Jupiter, FL (US)

( * ) Notice: Subject to any disclaimer, the term of this patent is extended or adjusted under 35 U.S.C. 154(b) by 608 days.

(21) Appl. No.: 13/136,907

(22) Filed: Aug. 15, 2011

(65) Prior Publication Data
US 2013/0042601 A1 Feb. 21, 2013

(51) Int. Cl.
*F01K 23/04* (2006.01)
*F01K 25/02* (2006.01)
*F16D 31/02* (2006.01)
*F15B 1/02* (2006.01)
*F02C 6/16* (2006.01)
*F01K 27/00* (2006.01)
*H02J 15/00* (2006.01)

(52) U.S. Cl.
CPC ............. *F15B 1/022* (2013.01); *Y02E 60/15* (2013.01); *F02C 6/16* (2013.01); *F01K 27/00* (2013.01); *H02J 15/006* (2013.01)
USPC ................................................. 60/655; 60/408

(58) Field of Classification Search
USPC .............. 60/408, 409, 410, 329, 655, 39.182, 60/39.183, 676, 650
See application file for complete search history.

(56) References Cited

U.S. PATENT DOCUMENTS

| 5,537,822 | A * | 7/1996 | Shnaid et al. | 60/659 |
| 2010/0251712 | A1 * | 10/2010 | Nakhamkin | 60/659 |
| 2011/0315255 | A1 * | 12/2011 | McBride et al. | 137/571 |

* cited by examiner

*Primary Examiner* — Edward Look
*Assistant Examiner* — Daniel Collins
(74) *Attorney, Agent, or Firm* — Shook, Hardy & Bacon L.L.P.

(57) ABSTRACT

A compressed air energy storage system integrated with a source of secondary heat, such as a simple cycle gas turbine, to increase power production and to provide power regulation through the use of stored compressed air heated by said secondary heat to provide power augmentation.

26 Claims, 14 Drawing Sheets

HIGH OUTPUT MODULAR CAES (HOMC)

FIELD OF THE INVENTION

This invention relates to electrical power generating capacity, and more specifically to energy storage that is useful for providing electrical power during periods of peak electrical power demand and power regulation.

BACKGROUND OF THE INVENTION

As demand for electric energy has risen in recent years, in some population centers such as New York City, the difference between the peak electric power that can be supplied and the peak demand for that electric power, referred to as "margin", has narrowed to the point that a severe anomaly could eliminate that margin altogether. For example, a sustained heat wave in New York City can erode that margin to the point that "brown-outs" occur, and if the supply of electric power cannot be increased, or demand outstrips the increased supply, "black-outs" can occur. To reduce the risk of "brown-outs" and "black-outs", responsible power authorities have tried to locate sufficient power generation capacity in or near population centers to meet normal electrical demand, and to provide for sufficient transmission grid capacity serving such areas so that in the event a severe anomaly such as a heat wave does occur, additional electrical energy from distant power plants can be provided to avoid "brown-outs" or "black-outs", albeit at a substantial cost due to the losses associated with transmission of electricity over long distances and at high load factors. Unfortunately, in times of extreme demand, the transmission grid has a limited capacity to provide additional electric power to population centers such as New York City, and despite years of discussion and a general acceptance of the need to upgrade the transmission grid, if and when additional capacity will be added remains unclear. In the absence of sufficient transmission grid capacity to meet severe anomalies, population centers such as New York City must rely on locally generated electrical power to meet that demand, thereby avoiding the need to bring that additional electrical power in over the transmission grid.

While "base-load" generating capacity may be provided by coal-fired power plants, nuclear power plants, or "combined cycle" gas turbines, generating capacity to meet peak demand is often provided by "simple cycle" gas turbines. As those skilled in the art will readily appreciate, simple cycle gas turbines produce substantial amounts of secondary heat, which is typically exhausted to the atmosphere. Combined cycle gas turbines also produce secondary heat, although to a lesser extent. As used herein, the term "secondary heat" means heat produced 1) as, or by, a byproduct of the machines, electrical equipment, or industrial or biological processes that produce it, or 2) as a useful product in machines, electrical equipment, or industrial or biological processes but which can also be used for a secondary purpose without impairing the function of such machines, electrical equipment, or industrial or biological processes.

Unfortunately, increasing local electrical power generation capacity by installing additional gas turbines to meet demand in times of severe anomalies faces substantial obstacles, the most obvious being cost. While the costs associated with installing "base-load" generation can be recouped by generating and selling electrical power 24 hours a day throughout the year, the costs associated with installing generating capacity to meet peak demand (so called "peakers") must be recouped over a few hours of operation per day during a few months of the year. Since this results in very high costs per megawatt hour of electrical power actually produced, power authorities are understandably hesitant to invest in additional peakers where they have other options.

Space is also an issue in population centers such as New York City, where real estate is at a premium. Acquiring sufficient land to build a new power plant while accommodating nearby residential and business interests can delay construction of additional power generation capacity long past the date that additional capacity is needed. Permitting requirements to achieve acceptable emissions levels can further delay construction of additional generating capacity, particularly in densely populated areas.

Faced with such cost, space and emissions obstacles, power authorities often resort to the use of existing, less efficient generating capacity. Since this generating capacity is already installed, costs and real estate are not an issue, and in some cases this generating capacity may be "grand-fathered" in under existing permits. Also, older gas turbines are generally not as efficient as newer ones, which translates to more waste heat being given off per megawatt hour being generated. As a result, use of this generating capacity often produces higher emissions, of carbon monoxide and/or other pollutants such as NOx and ozone, per megawatt hour of power generated than their "base-load" counterparts, which can raise air quality concerns depending upon what time of day this generating capacity is operated.

Compressed air energy storage ("CAES") plants have been considered as a potential solution to deal with peak electrical power demands in population centers. In general, these systems store compressed air using off-peak electrical power, and then use that compressed air to produce electrical power at times of peak demand. The air storage for CAES systems has traditionally been large underground caverns that were pressurized to a maximum pressure, and then bled down until they reached the minimum to the operating pressure of the expanders, at which time the expansion cycle was stopped until the compression cycle was run again. This type of cyclic duty results in a compression system where all of the stages of the compressor are always engaged and have a relative constant exit condition. For example, Dresser-Rand's "Smart-CAES" system which is shown schematically in FIGS. 1A and 1B uses single or multiple multi-stage intercooled compressors 101A, 101B, 101C, 101D, 101E, 101F, 101G to produce compressed air that is stored in an air storage cavern 107, and multi-stage expanders 102A, 102B, 102C, 102D, 102E, 102F to expand the compressed air, in which the compression and expansion equipment are separate systems. In typical CAES systems, a recuperator 108 is used to transfer heat from the exhaust gas 103 of an expander 102F to the compressed air as it exits the air storage cavern 107. The recuperator 108 preheats the compressed air before it enters a dedicated high pressure combustor 106. There, fuel 110 is added and combusted, to further heat the compressed air before it is fed into a high pressure expander 102A. The compressed air exiting the high pressure expander 102C is then reheated in a low pressure combustor 109, where more fuel 112 is added and combusted, prior to being fed into a low pressure expander 102D. The electrical power produced by the expanders of the SmartCAES is normally the product of diffusion combustion in the high and low pressure combustors 106, 109, with relatively high emissions which require a selective catalytic reducer ("SCR") (114) to meet common emission requirements (although some may now be operating with premixed combustion systems). In addition, since the SmartCAES systems are designed to have either 110 MW or 135 MW plant output ratings, either large natural caverns 107 must be available near the site of each SmartCAES installation, or the geology at the SmartCAES plant site must be suited for development of a cavern with the required characteristics. Therefore, locations for use of the SmartCAES system are limited by local geological conditions.

FIGS. 2A and 2B schematically show Energy Storage & Power's "CAES2" system, in which multiple multi-stage intercooled compressors 201A, 201B, 201C, 201D, 201E, 201F, 201G are used to produce compressed air that is stored in long air storage pipes, porous geological media or caverns 208. In the CAES2 system, a recuperator 206 is used to transfer heat from the exhaust gas of a gas turbine 207 to the compressed air prior to entering multi-stage expanders 202A, 202B, 202C, 202D, 202E, 202F. Depending on the particular system, partially expanded compressed air 203, specifically limited to that which can be bled from between the first and second expander stages 202A, 202B, may be taken off and delivered to the gas turbine's combustor 204 for power augmentation, or the compressed air may be expanded through all stages of the expanders 202A, 202B, 202C, 202D, 202E, 202F and then delivered directly to the inlet 205 of the gas turbine 207 as chilled air for power augmentation, provided that the air is below ambient temperature so as to be suitable for inlet cooling (see U.S. Pat. Nos. 5,934,063, 6,038,849, 6,134,893, 6,244,037, 6,305,158). These patented systems have recuperators 206, to preheat the air before it enters the expander 202A, and as a result, very hot compressed air is fed into the first stage of the expander 202A, often within 50° F. of the temperature of the gas turbine's exhaust gas. This very hot, compressed air is then expanded to ambient pressure in a manner such that the temperature of the compressed air does not go below freezing, to prevent icing issues in either the expander stages, or the gas turbine inlet. About 40% of the rated power output of a CAES2 plant is produced by the gas turbine 207 that is included with the system, and the remaining power comes from the generator 209 that is driven by the expanders 202A, 202B, 202C, 202D; 202E, 202F. The emissions of the CAES2 system are typically lower than those produced by the SmartCAES system due to incorporation of a gas turbine having a premix combustion system, and although the use of pipes for air storage 208 can allow the CAES2 system to be installed at locations that do not have existing caverns, the quantity of pipes needed by the CAES2 system increases the cost of installing a CAES2 system to the point that many power authorities may feel is prohibitive.

What is needed is a means of providing additional local electrical power during peak demand periods which does not necessitate the purchase of substantial quantities of additional land, can meet existing emissions requirements, has a high "round trip electrical efficiency" (i.e. energy output/energy input) and is cost-competitive as compared with other options.

BRIEF SUMMARY OF THE INVENTION

One advantage of the present embodiment is the ability to construct the system on a mobile platform capable of being transported in whole or in pieces.

Another advantage of the present embodiment is to provide local electrical power generation during peak demand periods which does not necessitate the purchase of substantial quantities of additional land.

Another advantage of the present embodiment is the ability to provide local electrical power generation, during peak demand periods, that can meet existing emissions requirements for operation during such periods.

Another advantage of the present embodiment is the ability to provide more megawatt hours of energy to the electrical grid than is consumed during the storage process, where waste heat is not considered.

Another advantage of the present embodiment is to provide local electrical power generation during peak demand periods that is cost-competitive as compared with other options.

Accordingly, an embodiment of the present invention is an energy storage and retrieval system for obtaining useful work from a source of heat, the system comprising means for producing compressed air, means for storing said compressed air, means for extracting work from the compressed air including a plurality of expanders, a plurality of first conduits, and a plurality of second conduits, each of the expanders having an inlet and an outlet, each of the first conduits connected to one of the inlets of the plurality of expanders to deliver the compressed air thereto, and each of the second conduits connected to one of the outlets of the plurality of expanders to receive the compressed air therefrom; and, means for transferring energy between the compressed air and a heat transfer fluid, including a first manifold, and a first plurality of heat exchangers, including an initial heat exchanger and a plurality of downstream heat exchangers, each of the first plurality of heat exchangers having a first heat exchange circuit including a first inlet and a first outlet, and a second heat exchange circuit including a second inlet and a second outlet, each of the first outlets of the first plurality of heat exchangers connected to one of the first conduits to deliver the compressed air thereto, each of the first inlets of the plurality of downstream heat exchangers connected to one of the second conduits to receive the compressed air therefrom, and each of the second inlets of the plurality of heat exchangers connected to the first manifold; wherein the energy is heat from the source of heat, and the first manifold is connected to the source of heat to receive the heat transfer fluid therefrom for transferring the energy to the compressed air.

More specifically, a present embodiment provides a compression circuit that has a plurality of compressor stages to compress air, with cooling of the compressed air between stages, and is operated in such a way to obtain a highly efficient compression process with changing exit pressure conditions to produce compressed air that is stored, preferably in high pressure tanks, and an expansion circuit that has a plurality of expander stages to expand the compressed air, with heat exchangers between expander stages to reheat the compressed air to a predetermined temperature using secondary heat from a source, such as the exhaust of an existing gas turbine.

Also, a present embodiment is an apparatus that comprises an energy storage and retrieval system for obtaining useful work from an existing source of secondary heat, comprising a source of compressed air, at least one generator, a plurality of expander stages, each of the plurality of expander stages having an inlet and an outlet, at least a portion of the plurality of expander stages having an outlet flow control, and each of the plurality of expander stages is connected to the generator. The present embodiment also includes a first manifold, and a first plurality of heat exchangers, including an initial heat exchanger and a first plurality of downstream heat exchangers, where each of the first plurality of heat exchangers has a first heat exchange circuit and a second heat exchange circuit, and each of the first heat exchange circuits of the first plurality of downstream heat exchangers is in selective fluid communication with one of the outlets of the plurality of expander stages through one of the outlet flow controls of the plurality of expander stages, and each of the second heat exchange circuits of the first plurality of heat exchangers is in fluid communication with the first manifold, and the first manifold is in fluid communication with the source of secondary heat to receive secondary heat therefrom.

The present embodiment uses high pressure air storage tanks, in conjunction with heating of the compressed air between expander stages, which substantially reduces the volume of compressed air that needs to be stored for a given megawatt-hours of energy output. Therefore, the cost of providing the air storage (for those power plants that are not located near a natural cavern) is reduced compared to the air storage devices used in the prior art, while the use of secondary heat from an existing source allows the present embodiment to meet local emissions requirements.

A present embodiment of the invention uses the same heat exchangers to perform both the cooling of the compressed air between stages of the compression circuit and the heating of the compressed air between stages of the expansion circuit to further reduce the capital cost of implementing the present embodiment as a solution for peak electric power demand at those sites where compression and expansion of air does not need to be performed simultaneously. Additionally, for an existing gas turbine located on a site adjacent a navigable waterway, the present invention may be incorporated into a barge that can be anchored adjacent such site, thereby avoiding the costs of acquiring land on which to place additional generating capacity.

Other advantages, features and characteristics of the present invention; as well as the methods of operation and the functions of the related elements of the structure and the combination of parts will become more apparent upon consideration of the following detailed description and appended claims with reference to the accompanying drawings, all of which form a part of this specification.

DETAILED DESCRIPTION OF THE INVENTION

Figure 1A:
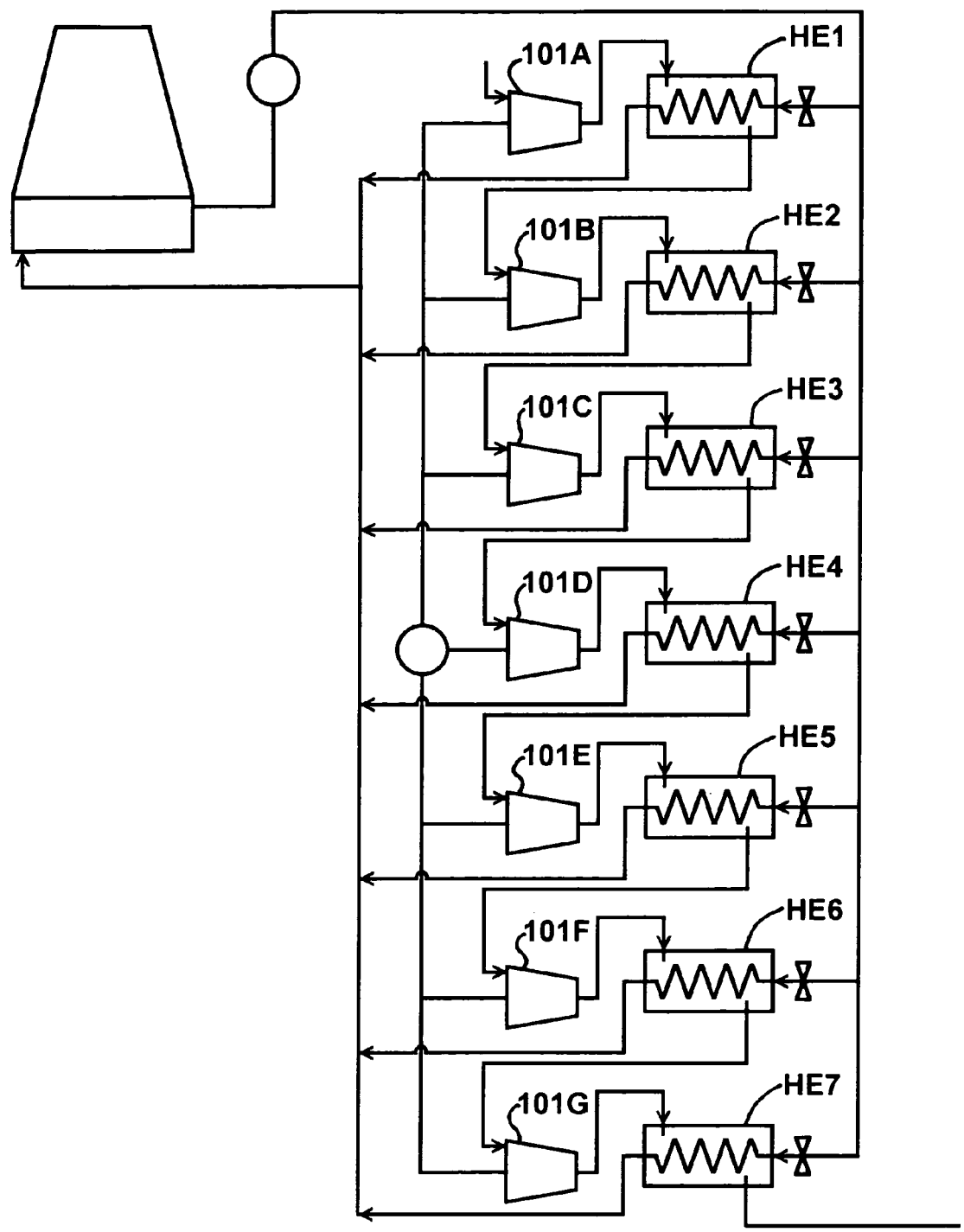
FIGS. 1A and 1B are a schematic drawing of a compressed air energy storage system of the prior art.
Figure 1B:
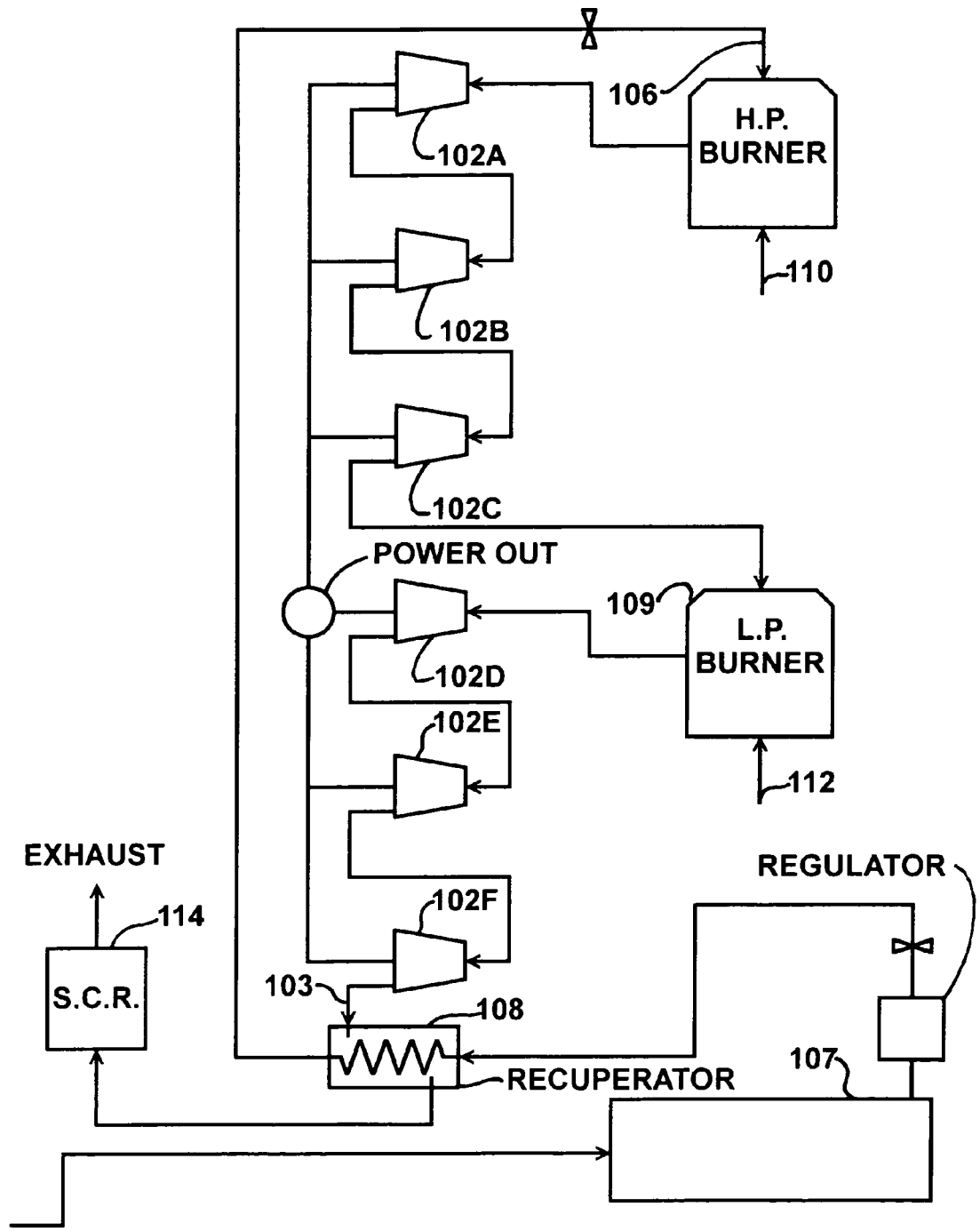
Figure 2A:
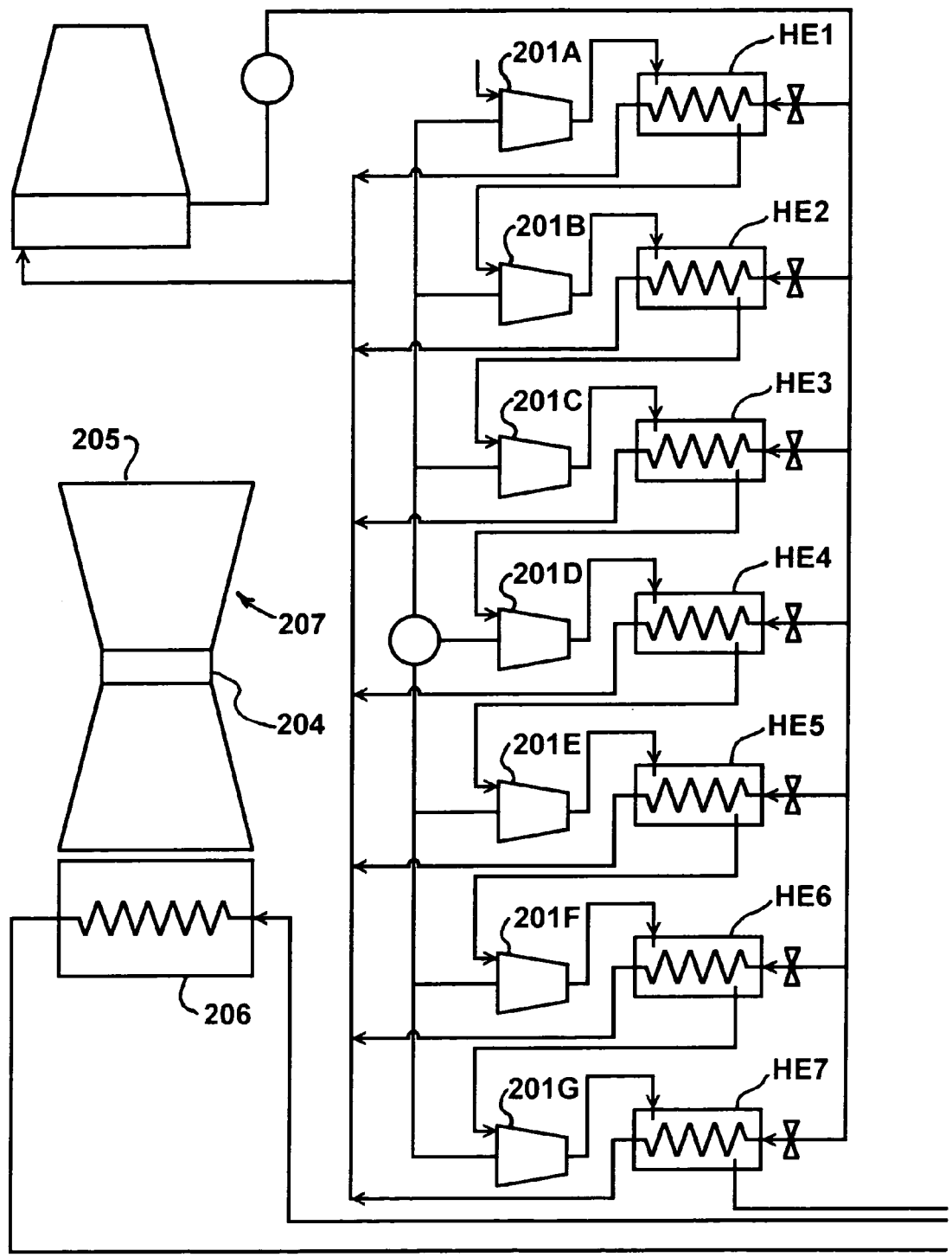
FIGS. 2A and 2B are a schematic drawing of another compressed air energy storage system of the prior art.
Figure 2B:
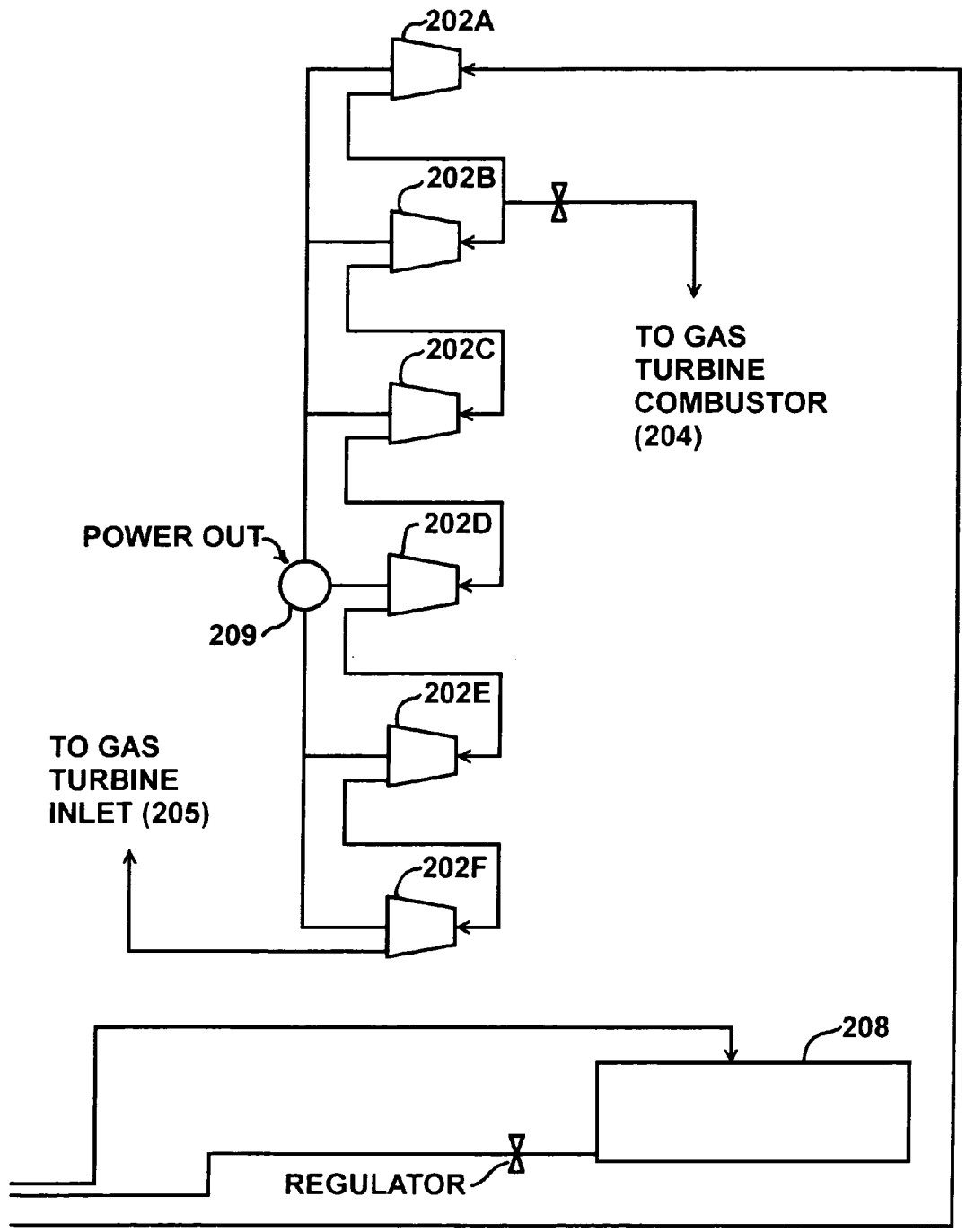
Figure 3A:
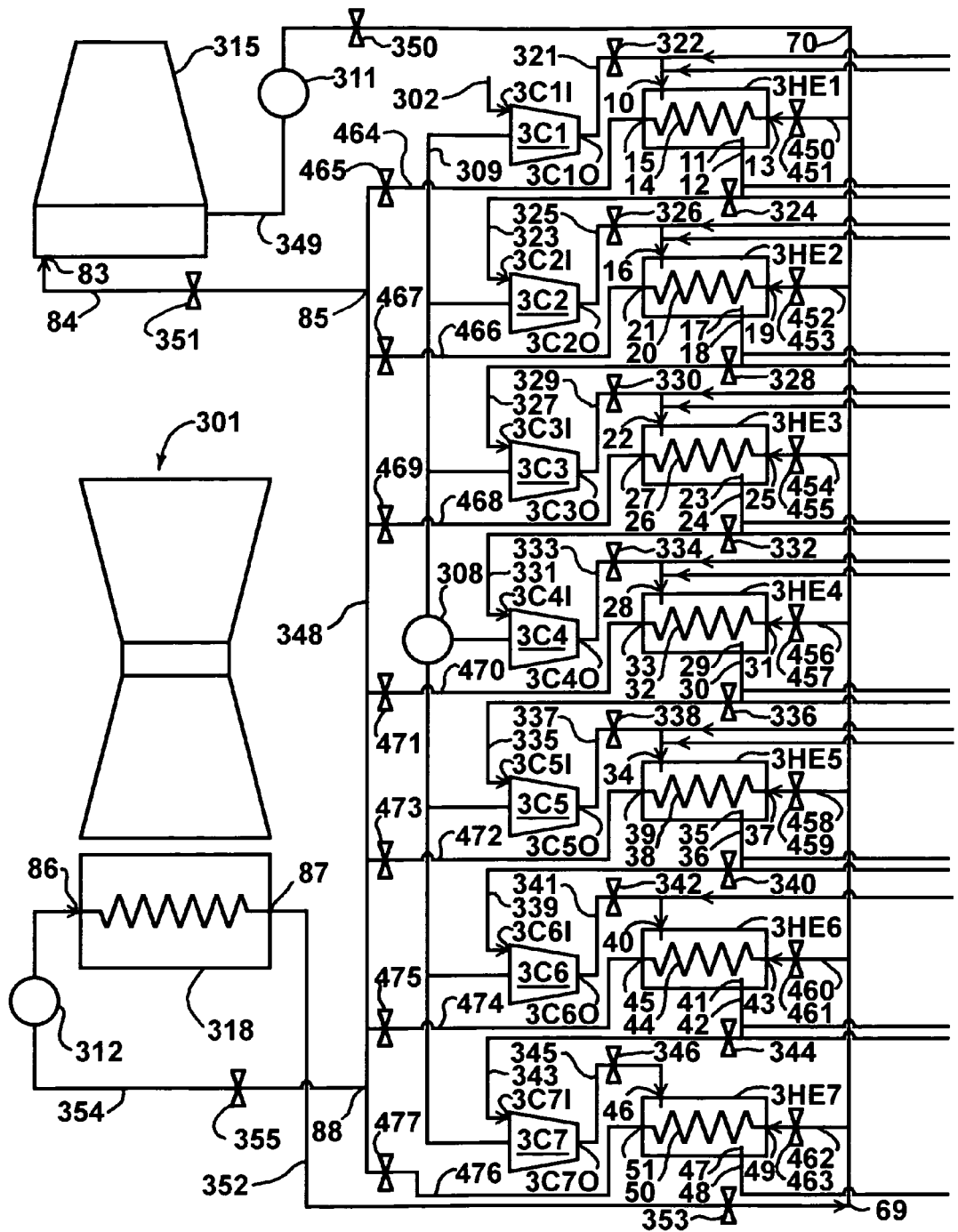
FIGS. 3A and 3B are a schematic drawing of the present embodiment in which the source of secondary heat is a simple cycle gas turbine.
Figure 3B:
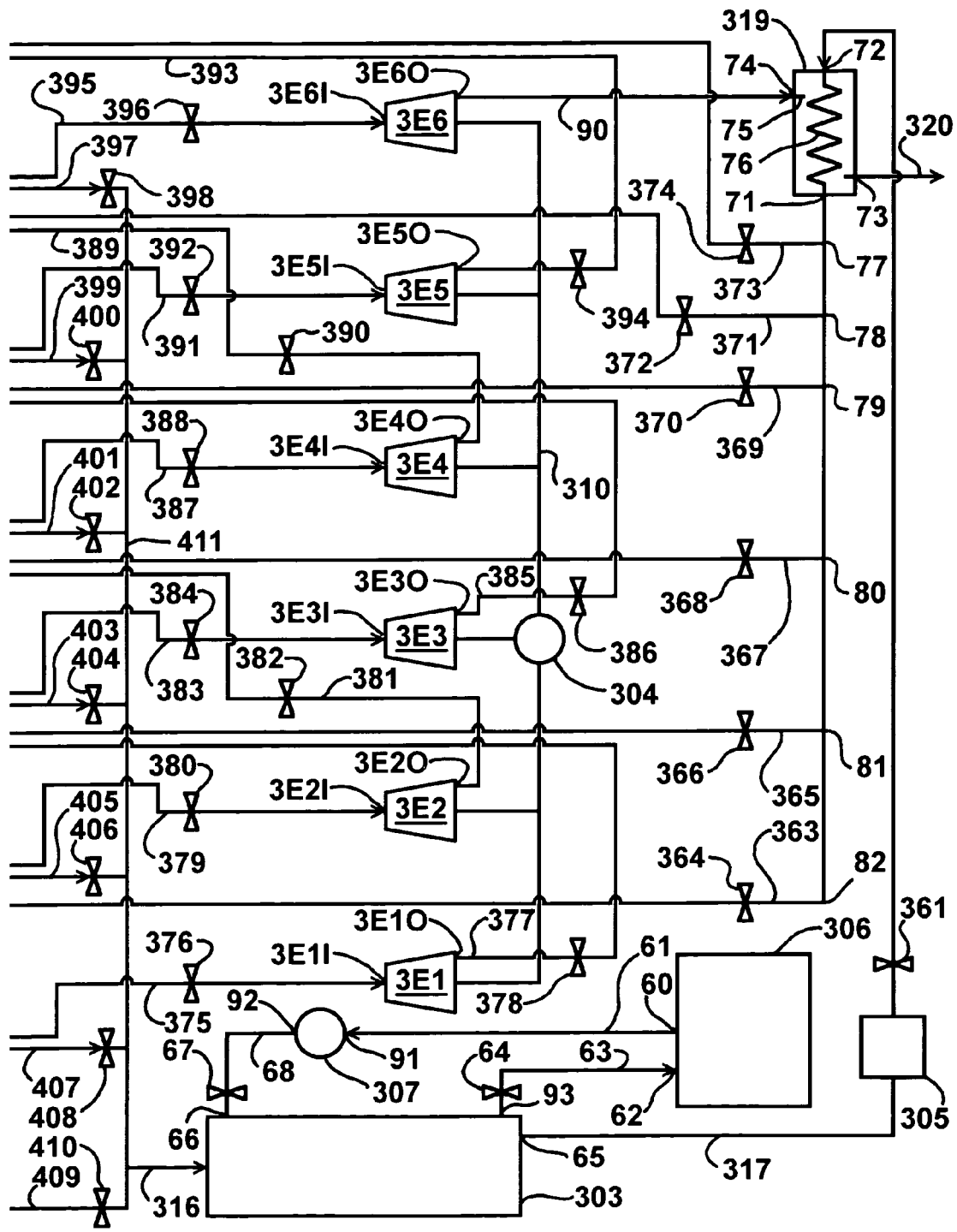

The components of preferred embodiment of the high output modular compressed air energy storage system ("HOMC") of the present invention are shown schematically in FIGS. 3A and 3B, as they are used with an existing gas turbine 301. In this embodiment, the same heat exchangers used to produce the compressed air that is delivered to the air storage are used in the process of expanding that compressed air to produce electricity. The preferred embodiment is useful where the compression process and the expansion processes are run at separate times, as is the case for typical compressed air energy storage.

More specifically, the preferred embodiment of the present invention includes a plurality of 3C1, 3C2, 3C3, 3C4, 3C5, 3C6, 3C7, compressor stages, which may be either centrifugal or axial depending on the particular cost targets and efficiencies desired, for producing compressed air from ambient air 302, an air storage 303 for storage and retrieval of the compressed air, a plurality of expander stages 3E1, 3E2, 3E3, 3E4, 3E5, 3E6 for driving a generator 304 from expansion of the compressed air, a regulator 305 for selectively controlling the pressure at which compressed air is released from the air storage, a hydraulic tank 306 and high pressure pump 307 for selectively filling the air storage with hydraulic fluid, preferably water, as described in greater detail below with respect to the present embodiment of the invention. As used herein, the term "air storage" means one or more tanks, pipes or other storage device of the type known in the art which can receive, retain, and deliver compressed air.

Each of the compressor stages 3C1, 3C2, 3C3, 3C4, 3C5, 3C6, 3C7 is driven by an electric motor 308 (preferably all of the plurality of compressor stages are driven by a single electric motor), and the expander stages 3E1, 3E2, 3E3, 3E4, 3E5, 3E6 collectively drive a single generator 304. As those skilled in the art will readily appreciate, the electric motor 308 and generator 304 described in the present invention may be a single combined motor/generator of the type that is known in the art, and the compressor stages 3C1, 3C2, 3C3, 3C4, 3C5, 3C6, 3C7 and expander stages 3E1, 3E2, 3E3, 3E4, 3E5, 3E6 may be mounted on common shafts 309, 310 with clutch systems on the motor/generator between the compressor shaft 309 and the expander shaft 310 to allow the motor/generator to 1) independently drive the compressor stages without driving, or being driven by, the expander stages, 2) be driven by the expander stages without driving the compressor stages, or 3) drive the compressor stages while being driven by the expander stages in certain embodiments of the present invention. In addition, the present invention includes circulation pumps 311, 312, a plurality of heat exchangers 3HE1, 3HE2, 3HE3, 3HE4, 3HE5, 3HE6, 3HE7 for transferring heat between the compressed air 314, the exhaust gas of the gas turbine 301, and a cooling source, such as a cooling tower 315, and the piping and valves necessary to interconnect the above-mentioned components. While the present invention is described in terms of centrifugal compressor stages and the flow control valves that control the flow of compressed air therethrough, it is to be understood that if axial flow compressor stages with variable inlet guide vanes and variable exit guide vanes were used, flow control may be accomplished with these as well. As used herein, a "flow control" means a valve or any mechanical device by which the flow of a fluid, either liquid or gas, may be selectively started, stopped, or regulated by a movable part that opens, shuts, or partially obstructs one or more ports or passageways.

As those skilled in the art will readily appreciate, each of the compressor stages 3C1, 3C2, 3C3, 3C4, 3C5, 3C6, 3C7 has an inlet through which air is received, and an outlet through which the air exits at a higher pressure and higher temperature. Conversely, each of the expander stages 3E1, 3E2, 3E3, 3E4, 3E5, 3E6 has an inlet through which compressed air is received, and an outlet through which the air exits at a lower pressure and lower temperature. Further, as shown in FIGS. 3A and 3B, each of the heat exchangers 3HE1, 3HE2, 3HE3, 3HE4, 3HE5, 3HE6, 3HE7 has a first heat transfer circuit with an inlet and an outlet, and a second heat transfer circuit with an inlet and an outlet. The air storage tank 303, which is comprised of a plurality of high pressure gas storage cylinders manifolded together, also includes an inlet 316 and an outlet 317.

As shown in FIGS. 3A and 3B, one of the heat exchangers 318 is in thermal contact with a heat source, for example, located inside the gas turbine exhaust manifold to receive heat from the hot exhaust gas exiting the gas turbine 301. That heat is then transferred to a heat transfer medium, preferably water and/or steam (collectively referred to herein as "hot water"), that is circulated through the exhaust gas heat exchanger 318 to receive heat therefrom. The water and/or steam is so heated and is used to provide heat to the compressed air as it passes through the heat exchangers, as described below. Another one of the heat exchangers, the pre-heater 319 is in thermal contact with the hot discharge gas that exits from the low pressure expander stage 3E6 to receive heat therefrom. This discharge gas heat exchanger (319), which is used as a pre-heater for the compressed air exiting the air storage, then transfers heat thereto. While this discharge gas heat exchanger is optional, its inclusion in the present invention minimizes the amount of secondary heat needed from the gas turbine, and cools the hot discharge gas that exits from the low pressure expander stage 3E6 before it is discharged to the atmosphere 320. While the present invention is described herein with respect to a system having seven compressor stages and six expander stages, those skilled in the art will readily appreciate that the actual quantities of compressor stages and expander stages depends on the specific application and cost optimization for which the HOMC is to be used.

The preferred embodiment of the present invention includes a compression circuit, an expansion circuit, a heat transfer circuit, and an air storage circuit. The compression circuit is made up of the compressor stages 3C1, 3C2, 3C3, 3C4, 3C5, 3C6, 3C7, the electric motor/generator that drives the compressor stages 304, 308, and the piping and flow control valves that carry the air as it is compressed from ambient 302 and delivered to the air storage 303. The expansion circuit is made up of the expander stages 3E1, 3E2, 3E3, 3E4, 3E5, 3E6, (which may be either centrifugal or axial depending on the particular cost targets, desired temperatures, and efficiencies desired), the electric generator 304 that is driven by the expander stages 3E1, 3E2, 3E3, 3E4, 3E5, 3E6, and the piping and flow control valves that carry the compressed air as it is expanded from the air storage 303 to ambient pressure 320. The heat transfer circuit is made up of the heat exchangers 3HE1, 3HE2, 3HE3, 3HE4, 3HE5, 3HE6, 3HE7, a heat transfer fluid supply line 352, and a heat transfer fluid return line 354, a heat transfer fluid supply manifold 347, a heat transfer fluid return manifold 348, a coolant supply line 349, and a coolant return line 84. The air storage circuit includes the air storage 303, the high pressure hydraulic pump 307, the water tank 306 which holds the hydraulic fluid pumped by the hydraulic pump 307, which is preferably water, and the piping and flow control valves that carry the hydraulic fluid as it is flows to and from the air storage 303, as described below.

Referring to FIGS. 3A and 3B, a first compression conduit 321 connects the outlet 3C1O of the first compressor stage 3C1 to the inlet 10 of the first circuit 11 of the first heat exchanger 3HE1. The first compression conduit 321 also includes a first air flow control valve 322 to control the flow of compressed air through the first compression conduit 321. A second compression conduit 323 connects the outlet 12 of the first circuit 11 of the first heat exchanger 3HE1 to the inlet 3C2I of the second compressor stage 3C2, and the second compression conduit 323 includes a second air flow control valve 324.

A third compression conduit 325 connects the outlet 3C2O of the second compressor stage 3C2 to the inlet 16 of the first circuit 17 of the second heat exchanger 3HE2, and the third compression conduit 325 includes a third air flow control valve 326. A fourth compression conduit 327 connects the outlet 18 of the first circuit 17 of the second heat exchanger 3HE2 to the inlet 3C3I of the third compressor stage 3C3, and the fourth compression conduit 327 includes a fourth air flow control valve 328.

A fifth compression conduit 329 connects the outlet 3C3O of the third compressor stage 3C3 to the inlet 22 of the first circuit 23 of the third heat exchanger 3HE3, and the fifth compression conduit 329 includes a fifth air flow control valve 330. A sixth compression conduit 331 connects the outlet 24 of the first circuit 23 of the third heat exchanger 3HE3 to the inlet 3C4I of the fourth compressor stage 3C4, and the sixth compression conduit 331 includes a sixth air flow control valve 332.

A seventh compression conduit 333 connects the outlet 3C4O of the fourth compressor stage 3C4 to the inlet 28 of the first circuit 29 of the fourth heat exchanger 3HE4, and the seventh compression conduit 333 includes a seventh air flow control valve 334. An eighth compression conduit 335 connects the outlet 30 of the first circuit 29 of the fourth heat exchanger 3HE4 to the inlet 3C5I of the fifth compressor stage 3C5, and the eighth compression conduit 335 includes an eighth air flow control valve 336.

A ninth compression conduit 337 connects the outlet 3C5O of the fifth compressor stage 3C5 to the inlet 34 of the first circuit 35 of the fifth heat exchanger 3HE5, and the ninth compression conduit 337 includes a ninth air flow control valve 338. A tenth compression conduit 338 connects the outlet 36 of the first circuit 37 of the fifth heat exchanger 3HE5 to the inlet 3C6I of the sixth compressor stage 3C6, and the tenth compression conduit 338 includes a tenth air flow control valve 340.

An eleventh compression conduit 341 connects the outlet 3C6O of the sixth compressor stage 3C6 to the inlet 40 of the first circuit 41 of the sixth heat exchanger 3HE6, and the eleventh compression conduit 341 includes an eleventh air flow control valve 342. A twelfth compression conduit 343 connects the outlet 42 of the first circuit 41 of the sixth heat exchanger 3HE6 to the inlet 3C7I of the seventh compressor stage 3C7, and the twelfth compression conduit 343 includes a twelfth air flow control valve 344.

A thirteenth compression conduit 345 connects the outlet 3C7 of the seventh compressor stage 3C7 to the inlet 46 of the first circuit 47 on the seventh heat exchanger 3HE7, and the thirteenth compression conduit 345 includes a thirteenth air flow control valve 346.

Referring again to FIGS. 3A and 3B, the present invention includes a heat transfer fluid supply manifold 347 and a heat transfer fluid return manifold 348. With respect to each of the heat exchangers 3HE1, 3HE2, 3HE3, 3HE4, 3HE5, 3HE6, 3HE7 having the outlet of one of the compressor stages 3C1, 3C2, 3C3, 3C4, 3C5, 3C6, 3C7 connected by a compression conduit to the inlet of the first circuit thereof, as described above, the inlet 13, 19, 25, 31, 37, 43, 49 of the second circuit 14, 20, 26, 32, 38, 44, 50 of each of those heat exchangers is connected by a supply conduit 450, 452, 454, 456, 458, 460, 462 to the heat transfer fluid supply manifold 347, and the outlet 15, 21, 27, 33, 39, 45, 51 of the second circuit 14, 20, 26, 32, 38, 44, 50 of each of those heat exchangers is connected by a return conduit 464, 466, 468, 470, 472, 474, 476 to the heat transfer fluid return manifold 348. Each of the supply conduits 450, 452, 454, 456, 458, 460, 462 and each of the return conduits 464, 466, 468, 470, 472, 474, 476 includes a flow control valve 465, 467, 469, 471, 473, 475, 477 to control the flow of a heat exchange fluid therethrough. A coolant supply line 349 connects the coolant source, preferably a water cooling tower 315, to the coolant inlet 70 of the heat transfer fluid supply manifold 347. Included in the coolant supply line 349 are a coolant circulating pump 311 and a coolant supply flow control valve 350. Preferably, the coolant circulating pump 311 is located between the coolant source 315 and the coolant supply flow control valve 350. In addition, a coolant return line 84 connects the coolant outlet 85 of the heat transfer fluid return manifold 348 to the inlet 83 of the coolant source 315, and included in the coolant return line is a coolant return flow control valve 351.

Likewise, a heat transfer fluid supply line 352 connects the heat source, preferably the outlet 87 of the heat exchanger 318 in the gas turbine exhaust case, to the heat transfer fluid inlet 69 of the heat transfer fluid supply manifold 347. Included in the heat transfer fluid supply line 352 is a heat transfer fluid supply flow control valve 353. In addition, a heat transfer fluid return line 354 connects the heat transfer fluid outlet 88 of the heat transfer fluid return manifold 348 to the inlet 86 of the heat exchanger 318 in the gas turbine exhaust case. Included in the heat transfer fluid return line are a heated water circulating pump 312 and a heat transfer fluid return flow control valve 355. Preferably, the heat transfer fluid circulating pump 312 is located between the inlet 86 of the heat exchanger 318 in the gas turbine exhaust case and the heat transfer fluid return flow control valve 355.

A compressed air supply line 317 connects an outlet 65 of the air storage 303 to the inlet 72 of the first circuit 76 of a pre-heater heat exchanger 319, and the compressed air supply line 317 includes an air flow control valve 361 and a pressure regulator 305. A compressed air manifold 314 is connected to the outlet 71 of the first circuit 76 of the pre-heater heat exchanger 319, and the compressed air manifold 310 includes six outlets. A first hydraulic line 68 connects the outlet 92 of the high pressure hydraulic pump 307 to a hydraulic inlet 66 on the lower portion of the air storage 303, and a flow control valve 67 is included in the first hydraulic line 68 to control the flow of hydraulic fluid into and out of the air storage 303. A second hydraulic line 61 connects the outlet 60 of the hydraulic tank 306 to the inlet 91 of the hydraulic pump 307, and a third hydraulic line 63 connects the inlet 62 of the hydraulic tank 306 to an outlet 93 on the lower portion of the air storage 303, and a flow control valve 64 is included in the third hydraulic line 63 to control the flow of hydraulic fluid therethrough. As those skilled in the art will readily appreciate, although the means for maintaining the pressure of the compressed air in the air storage 303 is described in terms of a hydraulic tank 306, a high pressure pump 307, and flow control valves 64, 67, if the present embodiments of the HOMC are used where deep water air storage is available, (e.g. a concrete tank with one or more orifices near the bottom to allow water to flow in and out as compressed air from the compressors stages is pumped into and bled out of the top of the concrete tank), such deep water air storage could substitute for the hydraulic tank 306, high pressure pump 307, and flow control valves 64, 67 shown in FIGS. 3A and 3B.

The preferred embodiment of the present invention includes six compressed air manifold discharge conduits 363, 365, 367, 369, 371, 373 connected to the compressed air manifold 314. A first compressed air manifold discharge conduit 363 connects the inlet 40 of the first circuit 41 of the sixth heat exchanger 3HE6 to the first compressed air manifold outlet 82, and the first compressed air manifold discharge conduit 363 includes a first expansion manifold air flow control valve 364. A second compressed air manifold discharge conduit 365 connects the inlet 34 of the first circuit 35 of the fifth heat exchanger 3HE5 to the second compressed air manifold outlet 81, and the second compressed air manifold discharge conduit 365 includes a second expansion manifold air flow control valve 366. A third compressed air manifold discharge conduit 367 connects the inlet 28 of the first circuit 29 of the fourth heat exchanger 3HE4 to the third compressed air manifold outlet 80, and the third compressed air manifold discharge conduit 367 includes a third expansion manifold air flow control valve 368. A fourth compressed air manifold discharge conduit 369 connects the inlet 22 of the first circuit 23 on the third heat exchanger 3HE3 to the fourth compressed air manifold outlet 79, and the fourth compressed air manifold discharge conduit 369 includes a fourth expansion manifold air flow control valve 370. A fifth compressed air manifold discharge conduit 371 connects the inlet 16 of the first circuit 17 of the second heat exchanger 3HE2 to the fifth compressed air manifold outlet 78, and the fifth compressed air manifold discharge conduit 371 includes a fifth expansion manifold air flow control valve 372. A sixth compressed air manifold discharge conduit 373 connects the inlet 10 of the first circuit 11 on the first heat exchanger 3HE1 to the sixth compressed air manifold outlet 77, and the sixth compressed air manifold discharge conduit 373 includes a sixth expansion manifold air flow control valve 374.

The present embodiment of the present invention also includes eleven expansion conduits connected to the expander stages. A first expansion conduit 375 connects the outlet 42 of the first circuit 41 of the sixth heat exchanger 3HE6 to the inlet 3E1I of the first expander stage 3E1, and the first expansion conduit 375 includes a first expansion air flow control valve 376.

A second expansion conduit 377 connects the outlet 3E1O of the first expander stage 3E1 to the inlet 34 of the first circuit 35 of the fifth heat exchanger 3HE5, and the second expansion conduit 377 includes a second expansion air flow control valve 378.

A third expansion conduit 379 connects the outlet 36 of the first circuit 35 on the fifth heat exchanger 3HE5 to the inlet 3E2I of the second expander stage 3E2, and the third expansion conduit includes a third expansion air flow control valve 380.

A fourth expansion conduit 381 connects the outlet 3E2O of the second expander stage 3E2 to the inlet 28 of the first circuit 29 of the fourth heat exchanger 3HE4, and the fourth expansion conduit 381 includes a fourth expansion air flow control valve 382.

A fifth expansion conduit 383 connects the outlet 30 of the first circuit 29 of the fourth heat exchanger 3HE4 to the inlet 3E3I of the third expander stage 3E3, and the fifth expansion conduit 383 includes a fifth expansion air flow control valve 384.

A sixth expansion conduit 385 connects the outlet 3E3O of the third expander stage 3E3 to the inlet 22 of the first circuit 23 of the third heat exchanger 3HE3, and the sixth expansion conduit 385 includes a sixth expansion air flow control valve 386.

A seventh expansion conduit 387 connects the outlet 24 of the first circuit 23 of the third heat exchanger 3HE3 to the inlet 3E4I of the fourth expander stage 3E4, and the seventh expansion conduit 387 includes a seventh expansion air flow control valve 388.

An eighth expansion conduit 389 connects the outlet 3E4O of the fourth expander stage 3E4 to the inlet 16 of the first circuit 17 of the second heat exchanger 3HE2, and the eighth expansion conduit 389 includes an eighth expansion air flow control valve 390.

A ninth expansion conduit 391 connects the outlet 18 of the first circuit 17 of the second heat exchanger 3HE2 to the inlet 3E5I of the fifth expander stage 3E5, and the ninth expansion conduit 391 includes a ninth expansion air flow control valve 392.

A tenth expansion conduit 393 connects the outlet 3E5O of the fifth expander stage 3E5 to the inlet 10 of the first circuit 11 of the first heat exchanger 3HE1; and the tenth expansion conduit 393 includes a tenth expansion air flow control valve 394.

An eleventh expansion conduit 395 connects the outlet 12 of the first circuit 11 on the first heat exchanger 3HE1 to the inlet 3E6I of the sixth expander stage 3E6, and the eleventh expansion conduit 395 includes an eleventh expansion air flow control valve 396.

A duct 90 connects the outlet 3E6O of the sixth expander stage 3E6 to the inlet 74 of the second circuit 75 of the pre-heater 319, and the outlet 73 of the second circuit 75 of the pre-heater 320 exhausts to the atmosphere. In addition to the foregoing, the preferred embodiment of the present invention includes six bypass conduits.

A first bypass conduit 397 connects the outlet 12 of the first circuit 11 of the first heat 3HE1 exchanger to the charging line 411 of the air storage 303, and the first bypass conduit 397 includes a first bypass air flow control valve 398.

A second bypass conduit 399 connects the outlet 18 of the first circuit 17 of the second heat exchanger 3HE2 to the charging line 411 of the air storage 303, and the second bypass conduit 399 includes a second bypass air flow control valve 400.

A third bypass conduit 401 connects the outlet 24 of the first circuit 23 of the third heat exchanger 3HE3 to the charging line 411 of the air storage 303, and the third bypass conduit 401 includes a third bypass air flow control valve 402.

A fourth bypass conduit 403 connects the outlet 30 of the first circuit 29 of the fourth heat exchanger 3HE4 to the charging line 411 of the air storage 303, and the fourth bypass conduit 403 includes a fourth bypass air flow control valve 404.

A fifth bypass conduit 405 connects the outlet 36 of the first circuit 35 of the fifth heat exchanger 3HE5 to the charging line 411 of the air storage 303, and the fifth bypass conduit 405 includes a fifth bypass air flow control valve 406.

A sixth bypass conduit 407 connects the outlet 42 of the first circuit 41 of the sixth heat exchanger 3HE6 to the charging line 411 of the air storage 303, and the sixth bypass conduit 407 includes a sixth bypass air flow control valve 408.

The present embodiment of the present invention also includes seven supply conduits connected to the second circuits of the heat exchangers 3HE1, 3HE2, 3HE3, 3HE4, 3HE5, 3HE6, 3HE7, and seven return conduits connected to the second circuits of the heat exchangers 3HE1, 3HE2, 3HE3, 3HE4, 3HE5, 3HE6, 3HE7. The first supply conduit 450 connects the supply manifold 347 to the inlet 13 of the second circuit 14 of the first heat exchanger 3HE1, and the first supply conduit 450 includes a first fluid flow control valve 451.

The second supply conduit 452 connects the supply manifold 347 to the inlet 19 of the second circuit 20 of the second heat exchanger 3HE2, and the second supply conduit 452 includes a second fluid flow control valve 453.

The third supply conduit 454 connects the supply manifold 347 to the inlet 25 of the second circuit 26 of the third heat exchanger 3HE3, and the third supply conduit 454 includes a third fluid flow control valve 455.

The fourth supply conduit 456 connects the supply manifold 347 to the inlet 31 of the second circuit 32 of the fourth heat exchanger 3HE4, and the fourth supply conduit 456 includes a fourth fluid flow control valve 457.

The fifth supply conduit 458 connects the supply manifold 347 to the inlet 37 of the second circuit 38 of the fifth heat exchanger 3HE5, and the fifth supply conduit 458 includes a fifth fluid flow control valve 459.

The sixth supply conduit 460 connects the supply manifold 347 to the inlet 43 of the second circuit 44 of the sixth heat exchanger 3HE6, and the sixth supply conduit 460 includes a sixth fluid flow control valve 461.

The seventh supply conduit 462 connects the supply manifold 347 to the inlet 49 of the second circuit 50 of the seventh heat exchanger 3HE7, and the seventh supply conduit 462 includes a first fluid flow control valve 463.

As those skilled in the art will readily appreciate, the flow control valves 451, 453, 455, 457, 459, 461, 463 in the supply conduits 450, 452, 454, 456, 458, 460, 462 are used as trim valves to increase or decrease the flow rate of coolant or heat transfer fluid through the second circuit of the heat exchangers HE1, HE2, HE3, HE4, HE5, HE6, HE7 to optimize the temperature and pressure of the compressed air entering the compressor stages and expander stages of the present embodiment. While this results in more efficient operation of the compressor stages and expander stages, these flow control valves are optional 451, 453, 455, 457, 459, 461, 463 and may be eliminated if such optimization is not desired for a particular HOMC application.

The first return conduit 464 connects the return manifold 348 to the outlet 15 of the second circuit 14 of the first heat exchanger 3HE1, and the first return conduit 464 includes a first fluid flow control valve 465.

The second return conduit 466 connects the return manifold 348 to the outlet 21 of the second circuit 20 of the second heat exchanger 3HE2, and the second return conduit 466 includes a second fluid flow control valve 467.

The third return conduit 468 connects the return manifold 348 to the outlet 27 of the second circuit 26 of the third heat exchanger 3HE3, and the third return conduit 468 includes a third fluid flow control valve 469.

The fourth return conduit 470 connects the supply manifold 348 to the outlet 33 of the second circuit 32 of the fourth heat exchanger 3HE4, and the fourth supply conduit 470 includes a fourth fluid flow control valve 471.

The fifth return conduit 472 connects the return manifold 348 to the outlet 39 of the second circuit 38 of the fifth heat exchanger 3HE5, and the fifth return conduit 472 includes a fifth fluid flow control valve 473.

The sixth return conduit 474 connects the return manifold 348 to the outlet 45 of the second circuit 44 of the sixth heat exchanger 3HE6, and the sixth return conduit 474 includes a sixth fluid flow control valve 475.

The seventh return conduit 474 connects the return manifold 348 to the outlet 51 of the second circuit 50 of the seventh heat exchanger 3HE7, and the seventh return conduit 474 includes a seventh fluid flow control valve 475.

The preferred embodiment of the present invention has two compression modes, one that is used when the air storage 303 is empty (the "Complete Air Storage Compression Mode") and another that may be used when the air storage 303 has residual compressed air from being previously charged with compressed air (the "Partial Air Storage Compression Mode").

In the Complete Air Storage Mode, prior to beginning the compression operation, all of the flow control valves are in the closed position. When the air compression is about to begin, the flow control valve 350 in the coolant supply line 349, the flow control valve 351 in the coolant return line 84, and the flow control valves 451, 453, 455, 457, 459, 461, 463, 465, 467, 469, 471, 473, 475, 477 in the supply conduits 450, 452, 454, 456, 458, 460, 462 and return conduits 464, 466, 468, 470, 472, 474, 476 connected to the second circuits 14, 20, 26, 32, 38, 44, 50 of the heat exchangers 3HE1, 3HE2, 3HE3, 3HE4, 3HE5, 3HE6, 3HE7, are opened, and the coolant circulating pump 311 is turned on. Once coolant from the cooling tower 315 is being circulated through the second circuit 14, 20, 26, 32, 38, 44, 50 of each of the heat exchangers 3HE1, 3HE2, 3HE3, 3HE4, 3HE5, 3HE6, 3HE7 that has a compressor stage 3C1, 3C2, 3C3, 3C4, 3C5, 3C6, 3C7 connected to the inlet of the first circuit thereof, the air flow control valve 322 in the first compression conduit 321 is opened fully, and the air flow control valve 398 in the first bypass conduit 397 is opened partially. Then the flow control valve 64 in the third hydraulic line 63 is opened, the electric motor 308 that drives the first compressor stage 3C1 is turned on, and the first compressor stage 3C1 begins drawing in ambient air and expelling that air through the outlet 3C1O thereof. As those skilled in the art will readily appreciate, centrifugal compressor stages need a certain backpressure in order to compress air efficiently, and this backpressure is achieved by keeping the air flow control valve 398 in the first bypass conduit 397 only partially opened while the air pressure therein rises. Once the air pressure in the first bypass conduit 397 stops rising and reaches a steady state pressure, the air flow control valve 398 in the first bypass conduit 397 is regulated (i.e. opened in small increments) to allow the maximum air flow therethrough while maintaining that steady state pressure. Under these conditions, air that is compressed from ambient to the steady state pressure experiences a significant increase in the temperature of the compressed air exiting the first compressor stage 3C1. As that compressed air flows through the first heat exchanger 3HE1, it loses heat to the coolant flowing through the second circuit 14 thereof, cooling the compressed air and allowing the first compressor stage 3C1 to operate more efficiently.

Since the flow control valve 64 in the third hydraulic line 63 is open, the pressure of the compressed air exiting the first compressor 3C1 and entering the air storage 303 drives the hydraulic fluid from the air storage 303 and into the hydraulic tank 306. After substantially all of the hydraulic fluid has been driven from the air storage 303 by the compressed air, the flow control valve 64 in the third hydraulic line 63 is closed so that the air storage 303 is no longer in fluid communication with the hydraulic tank 306, causing the pressure of the compressed air in the air storage 303 to rise.

The air flow control valve 398 in the first bypass conduit 397 continues to be regulated until the compressed air in the air storage 303 has achieved substantially the same pressure as the steady state pressure in the first bypass conduit 397 upstream of the air flow control valve 398 therein. Once this occurs, the second compressor stage 3C2 is turned on, if it is not already running, the air flow control valve 400 in the second bypass conduit 399 is opened partially, the air flow control valves 324, 326 in the second and third compression conduits 323, 325 are opened fully, and the air flow control valve 398 in the first bypass conduit 397 is closed.

This causes the second compressor stage 3C2 to begin drawing in compressed air from the outlet 12 of the first circuit 11 of the first heat exchanger 3HE1 and expelling compressed air through the outlet 3C2O of the second compressor stage 3C2 and into the inlet 16 of the first circuit 17 of the second heat exchanger 3HE2, losing heat to the coolant flowing through the second circuit 20 thereof, cooling the compressed air. As the second compressor stage 3C2 continues to run, the air pressure in the second bypass conduit 399 rises. Once the air pressure in the second bypass conduit 399 stops rising and reaches a steady state pressure, the air flow control valve 400 in the second bypass conduit 399 is regulated to allow the maximum air flow therethrough while maintaining that steady state pressure of the compressed air.

The air flow control valve 400 in the second bypass conduit 399 continues to be regulated until the compressed air in the air storage 303 has achieved substantially the same pressure as the steady state pressure in the second bypass conduit 399 upstream of the air flow control valve 400 therein. Once this occurs, the third compressor stage 3C3 is turned on, if it is not already running, the air flow control valve 402 in the third bypass conduit 401 is opened partially, the air flow control valves 328, 330 in the fourth and fifth compression conduits 327, 329 are opened fully, and the air flow control valve 400 in the second bypass conduit 399 is closed.

This causes the third compressor stage 3C3 to begin drawing in compressed air from the outlet 18 of the first circuit 17 of the second heat exchanger 3HE2 and expelling compressed air through the outlet 3C3O of the third compressor stage 3C3 and into the inlet 22 of the first circuit 23 of the third heat exchanger 3HE3, losing heat to the coolant flowing through the second circuit 26 thereof, cooling the compressed air. As the third compressor stage 3C3 continues to run, the air pressure in the third bypass conduit 401 rises. Once the air pressure in the third bypass conduit 401 stops rising and reaches a steady state pressure, the air flow control valve 402 in the third bypass conduit 401 is regulated to allow the maximum air flow therethrough while maintaining that steady state pressure of the compressed air.

The air flow control valve 402 in the third bypass conduit 401 continues to be regulated until the compressed air in the air storage 303 has achieved substantially the same pressure as the steady state pressure in the third bypass conduit 401 upstream of the air flow control valve 402 therein. Once this occurs, the fourth compressor stage 3C4 is turned on, if it is not already running, the air flow control valve 404 in the fourth bypass conduit 403 is opened partially, the air flow control valves 332, 334 in the sixth and seventh compression conduits 331, 333 are opened fully, and the air flow control valve 402 in the third bypass conduit 401 is closed.

This causes the fourth compressor stage 3C4 to begin drawing in compressed air from the outlet 24 of the first circuit 23 of the third heat exchanger 3HE3 and expelling compressed air through the outlet 3C4O of the fourth compressor stage 3C4 and into the inlet of the first circuit 28 of the fourth heat exchanger 3HE4, losing heat to the coolant flowing through the second circuit 32 thereof, cooling the compressed air. As the fourth compressor stage 3C4 continues to run, the air pressure in the fourth bypass conduit 403 rises. Once the air pressure in the fourth bypass conduit 403 stops rising and reaches a steady state pressure, the air flow control valve 404 in the fourth bypass conduit 403 is regulated to allow the maximum air flow therethrough while maintaining that steady state pressure of the compressed air.

The air flow control valve 404 in the fourth bypass conduit 403 continues to be regulated until the compressed air in the air storage 303 has achieved substantially the same pressure as the steady state pressure in the fourth bypass conduit 403 upstream of the air flow control valve 404 therein. Once this occurs, the fifth compressor stage 3C5 is turned on, if it is not already running, the air flow control valve 406 in the fifth bypass conduit 405 is opened partially, the air flow control valves 336, 338 in the eighth and ninth compression conduits 335, 337 are opened fully, and the air flow control valve 404 in the fourth bypass conduit 403 is closed.

This causes the fifth compressor stage 3C5 to begin drawing in compressed air from the outlet 30 of the first circuit 29 of the fourth heat exchanger 3HE4 and expelling compressed air through the outlet 3C5O of the fifth compressor stage 3C5 and into the inlet 34 of the first circuit 35 of the fifth heat exchanger 3HE5, losing heat to the coolant flowing through the second circuit 38 thereof, cooling the compressed air. As the fifth compressor stage 3C5 continues to run, the air pressure in the fifth bypass conduit 405 rises. Once the air pressure in the fifth bypass conduit 405 stops rising and reaches a steady state pressure, the air flow control valve 406 in the fifth bypass conduit 405 is regulated to allow the maximum air flow therethrough while maintaining that steady state pressure of the compressed air.

The air flow control valve 406 in the fifth bypass conduit 405 continues to be regulated until the compressed air in the air storage 303 has achieved substantially the same pressure as the steady state pressure in the fifth bypass conduit 405 upstream of the air flow control valve 406 therein. Once this occurs, the sixth compressor stage 3C6 is turned on, if it is not already running, the air flow control valve 408 in the sixth bypass conduit 407 is opened partially, the air flow control valves 340, 342 in the tenth and eleventh compression conduits 339, 341 are opened fully, and the air flow control valve 406 in the fifth bypass conduit 405 is closed.

This causes the sixth compressor stage 3C6 to begin drawing in compressed air from the outlet 36 of the first circuit 35 of the fifth heat exchanger 3HE5 and expelling compressed air through the outlet 3C6O of the sixth compressor stage 3C6 and into the inlet 40 of the first circuit 41 of the sixth heat exchanger 3HE6, losing heat to the coolant flowing through the second circuit 44 thereof, cooling the compressed air. As the sixth compressor stage 3C6 continues to run, the air pressure in the sixth bypass conduit 407 rises. Once the air pressure in the sixth bypass conduit 407 stops rising and reaches a steady state pressure, the air flow control valve 408 in the sixth bypass conduit 407 is regulated to allow the maximum air flow therethrough while maintaining that steady state pressure of the compressed air.

The air flow control valve 408 in the sixth bypass conduit 407 continues until the compressed air in the air storage 303 has achieved substantially the same pressure as the steady state pressure in the sixth bypass conduit 407 upstream of the air flow control valve 408 therein. Once this occurs, the seventh compressor stage 3C7 is turned on, if it is not already running, the air flow control valve 410 in the fourteenth compression conduit 409 is opened partially, the air flow control valves 344, 346 in the twelfth and thirteenth compression conduits 343, 345 are opened fully, and the air flow control valve 408 in the sixth bypass conduit 407 is closed.

This causes the seventh compressor stage 3C7 to begin drawing in compressed air from the outlet 42 of the first circuit 41 of the sixth heat exchanger 3HE6 and expelling compressed air through the outlet 3C7O of the seventh compressor stage 3C7 and into the inlet 46 of the first circuit 47 of the seventh heat exchanger 3HE7, losing heat to the coolant flowing through the second circuit 50 thereof, cooling the compressed air. As the seventh compressor stage 3C7 continues to run, the air pressure in the fourteenth compression conduit 409 rises. Once the air pressure in the fourteenth compression conduit 409 stops rising and reaches a steady state pressure, the air flow control valve 410 in the fourteenth conduit 409 is regulated to allow the maximum air flow therethrough while maintaining that steady state pressure of the compressed air in the fourteenth conduit 409 upstream of the air flow control valve 410 therein. The compressor stages continue to run in this manner until the air storage 303 has reached the desired pressure, at which point all of the flow control valves are closed and the motors 308, 311 driving the compressor stages 3C1, 3C2, 3C3, 3C4, 3C5, 3C6, 3C7 and circulating pump 311 are shut off.

As those skilled in the art will readily appreciate, if the type of compressors used incorporate variable compressor guide vanes, such vanes may be able to perform some of the flow control functions described herein such as providing backpressure to the compressors and restricting air flow to certain compressors during process of storing compressed air in the air storage 303.

Operation in the Partial Air Storage Compression Mode is similar to that described above for the Complete Air Storage Compression Mode, except that once the compressed air in the first bypass conduit 397 upstream of the air flow control valve 398 reaches a steady state condition, if the pressure of the compressed air in the air storage is higher than the compressed air in the first bypass conduit 397 upstream of the air flow control valve 398, that air flow control valve 398 is fully closed and the air flow control valves 324, 326 in the second and third conduits 323, 325 open to allow the compressed air flowing from the outlet 12 of the first circuit 11 of the first heat exchanger 3HE1 to flow through the second compressor stage 3C2, through the first circuit 17 in the second heat exchanger 3HE2, and into the second bypass conduit 399. Once the compressed air in the second bypass conduit 399 upstream of the air flow control valve 400 reaches a steady state condition, if the pressure of the compressed air in the air storage 303 is still higher than the compressed air in the second bypass conduit 399 upstream of the air flow control valve 400, that air flow control valve 400 is fully closed and the air flow control valves 328, 330 in the fourth and fifth conduits 327, 329 open to allow the compressed air flowing from the outlet 18 of the first circuit 17 of the second heat exchanger 3HE2 to flow through the third compressor stage 3C3, through the first circuit 23 in the third heat exchanger 3HE3, and into the third bypass conduit 401. This process continues through the remaining compressor stages 3C4, 3C5, 3C6, 3C7 until a condition is reached where the steady state pressure achieved in one of the bypass conduits exceeds the pressure of the compressed air in the air storage 303. Once that condition is met, the compression process continues from that point forward as described above for the Complete Air Storage Compression Mode.

When it is desired to generate electricity from the compressed air in the air storage, the manner in which the compressed air is released depends on whether all of the energy in the compressed air is to be used for power generation (the "Sliding Pressure Mode"), or whether the maximum and/or minimum pressure of the compressed air delivered to the first expander stage E1 is to be regulated (the "Regulated Pressure Mode"), which is discussed in greater detail below.

In the Sliding Pressure Mode, prior to beginning the expansion operation, all of the flow control valves are in the closed position, and the gas turbine exhaust is heating the heat exchanger 318 in the gas turbine exhaust case. When expansion of the compressed air is about to begin, the flow control valve 353 in the heat transfer fluid supply line 352, the flow control valve 355 in the heat transfer fluid return line 354, and the flow control valves 451, 453, 455, 457, 459, 461, 463, 465, 467, 469, 471, 473, 475, 477 in the supply conduits 450, 452, 454, 456, 458, 460, 462 and return conduits 464, 466, 468, 470, 472, 474, 476 connected to the second circuits 14, 20, 26, 32, 38, 44, 50 of the heat exchangers 314E1, 3HE2, 3HE3, 3HE4, 3HE5, 3HE6, 3HE7, are opened and the heat transfer fluid circulating pump 312 is turned on. Then the flow control valve 361 in the compressed air supply line 317 is opened, the flow control valves 376, 378, 380, 382, 384, 386, 388, 390, 392, 394, 396 in each of the expansion conduits 375, 377, 379, 381, 383, 385, 387, 389, 391, 393, 395 are opened, and the flow control valve 364 in the first compressed air manifold discharge conduit 363 is opened. This allows compressed air to flow from the air storage 303 through the compressed air supply line 317, through the first circuit 76 of the pre-heater heat exchanger 319, into the compressed air manifold 314, out the first outlet 82 thereof, and into the first compressed air manifold discharge conduit 363. Compressed air from the first compressed air manifold discharge conduit 363 flows into the inlet 40 of the first circuit 41 of the sixth heat exchanger 3HE6, through the first circuit thereof 41, and out the outlet 42 of the first circuit 41, being heated by the hot heat transfer fluid circulating through the second circuit 44 thereof to approximately the same temperature as the heat transfer fluid.

The heated, compressed air exiting the sixth heat exchanger 3HE6 then flows through the first expansion conduit 375 to the inlet 3E1I of the first expander stage 3E1, expands through the first expander stage 3E1 performing work that drives the generator 304, and then exits the first expander stage 3E1 into the second expansion conduit 377 at a substantially lower pressure and temperature. This cooler compressed air then flows from the second expansion conduit 377 into the inlet 34 of the first circuit 35 of the fifth heat exchanger 3HE5, through the first circuit 35 thereof, and out the outlet of the first circuit 35, being heated by the heat transfer fluid circulating through the second circuit 38 thereof back up to approximately the same temperature as the heat transfer fluid.

The heated, compressed air exiting the fifth heat exchanger 3HE5 then flows through the third expansion conduit 379 to the inlet 3E2I of the second expander stage 3E2, expands through the second expander stage 3E2 performing work that drives the generator 304, and then exits the second expander stage 3E2 into the fourth expansion conduit 381 at a substantially lower pressure and temperature. This cooler compressed air then flows from the fourth expansion conduit 381 into the inlet 28 of the first circuit 29 of the fourth heat exchanger 3HE4, through the first circuit 29 thereof, and out the outlet 30 of the first circuit 29, being heated by the heat transfer fluid circulating through the second circuit 32 thereof back up to approximately the same temperature as the heat transfer fluid.

The heated, compressed air exiting the fourth heat exchanger 3HE4 then flows through the fifth expansion conduit 383 to the inlet 3E3I of the third expander stage 3E3, expands through the third expander stage 3E3 performing work that drives the generator 304, and then exits the third expander stage 3E3 into the sixth expansion conduit 385 at a substantially lower pressure and temperature. This cooler compressed air then flows from the sixth expansion conduit 385 into the inlet 22 of the first circuit 23 of the third heat exchanger 3HE3, through the first circuit 23 thereof, and out the outlet 24 of the first circuit 23, being heated by the heat transfer fluid circulating through the second circuit 26 thereof back up to approximately the same temperature as the heat transfer fluid.

The heated, compressed air exiting the third heat exchanger 3HE3 then flows through the seventh expansion conduit 387 to the inlet 3E4I of the fourth expander stage 3E4, expands through the fourth expander stage 3E4 performing work that drives the generator 304, and then exits the fourth expander stage 3E4 into the eighth expansion conduit 389 at a substantially lower pressure and temperature. This cooler compressed air then flows from the eighth expansion conduit 389 into the inlet 16 of the first circuit 17 of the second heat exchanger 3HE2, through the first circuit 17 thereof, and out the outlet 18 of the first circuit 17, being heated by the heat transfer fluid circulating through the second circuit thereof back up to approximately the same temperature as the heat transfer fluid.

The heated, compressed air exiting the second heat exchanger 3HE2 then flows through the ninth expansion conduit 391 to the inlet 3E5I of the fifth expander stage 3E5, expands through the fifth expander stage 3E5 performing work that drives the generator 304, and then exits the fifth expander stage 3E5 into the tenth expansion conduit 393 at a substantially lower pressure and temperature. This cooler compressed air then flows from the tenth expansion conduit 393 into the inlet 10 of the first circuit 11 of the first heat exchanger 3HE1, through the first circuit 11 thereof, and out the outlet 12 of the first circuit 11, being heated by the heat transfer fluid circulating through the second circuit thereof back up to approximately the same temperature as the heat transfer fluid.

The heated, compressed air exiting the first heat exchanger 3HE1 then flows through the eleventh expansion conduit 395 to the inlet 3E6I of the sixth expander stage 3E6, expands through the sixth expander stage 3E6 performing work that drives the generator 304, and then exits the sixth expander stage 3E6 into the second circuit 75 of the pre-heater heat exchanger 319, thereby heating the compressed air flowing from the compressed air supply line 317 through the first circuit 76 of the pre-heater heat exchanger 319, and on to the compressed air manifold 314. The compressed air from the sixth expander stage 3E6 then exits the second circuit 75 of the pre-heater heat exchanger 319 and is exhausted into the atmosphere.

As those skilled in the art will readily appreciate, as the expander stages 3E1, 3E2, 3E3, 3E4, 3E5, 3E6 are running, the pressure of the compressed air in the air storage 303 is decreasing, and at some point the pressure of the compressed air remaining in the air storage 303 will be insufficient to drive all of the expander stages 3E1, 3E2, 3E3, 3E4, 3E5, 3E6, with the result that some of the downstream expander stages will not be able to drive the generator 304, and may themselves become merely a load on the generator 304. To avoid this, in the Sliding Pressure Mode of operation of the present invention, when the pressure of the compressed air in the air storage 30 falls to a predetermined pressure, the air flow control valve 366 in the second compressed air manifold discharge conduit 365 is opened and the air flow control valve 364 in the first compressed air manifold discharge conduit 363, and the flow control valves 376, 378 in the first and second expansion conduits 375, 377, are closed. Doing so bypasses the first expander stage 3E1, redirecting the compressed air from the air storage 303 to the fifth heat exchanger 3HE5 and the second expander stage 3E2, thereby allowing the remaining expander stages 3E2-3E6 to continue generating electrical power as described above, although not as much electrical power as was being generated just prior to the first expander stage 3E1 being bypassed.

The expander stages 3E2, 3E3, 3E4, 3E5, 3E6 that have not been bypassed continue to operate as described above until the pressure of the compressed air in the air storage 303 falls to a second predetermined pressure, at which point the air flow control valve 368 in the third compressed air manifold discharge conduit 367 is opened and the air flow control valve 366 in the second compressed air manifold discharge conduit 365, and the flow control valves 380, 382 in the third and fourth expansion conduits 379, 381 are closed. Doing so bypasses the second expander stage 3E2, redirecting the compressed air from the air storage 303 to the fourth heat exchanger 3HE4 and the third expander stage 3E3, thereby allowing the remaining expander stages 3E3-3E6 to continue generating electrical power as described above, although not as much electrical power as was being generated just prior to the second expander stage 3E2 being bypassed.

This process continues as the pressure of the compressed air in the air storage 303 falls to a third, fourth and fifth predetermined pressure, and as the pressure of the compressed air in the air storage 303 reaches each predetermined pressure, the expander stage receiving the highest pressure compressed air is bypassed by closing the air flow control valves in the expansion conduits connected thereto, and opening the air flow control valve in the compressed air manifold discharge conduit that is connected to the inlet of the same heat exchanger that the expansion conduit connected to the outlet of such expander stage is connected. The expander stages that have not been bypassed continue to operate as described above until the pressure of the compressed air in the air storage 303 is too low to drive just the sixth expander stage 3E6, at which point compressed air electrical generation stops, and all of the flow control valves are closed.

As those skilled in the art will readily appreciate, the Sliding Pressure Mode allows the efficient use of all of the compressed air in the air storage for the generation of electricity, but the megawatt output using the Sliding Pressure Mode is constantly decreasing. For some power plant operators, it may be desirable sacrifice some efficiency by throttling the compressed air exiting the air storage—which inherently introduces inefficiencies as a pressure drop is taken across the throttle without useful work being performed—in order to produce a constant level of megawatts over a fixed period of time, such as when an electrical grid operator requests a power plant operator to increase power production by 10 MW for four hours. In this situation, the plant operator may want to operate the present embodiment of the present invention in the Regulated Pressure Mode. For example, if the pressure of the compressed air in the air storage is 1200 psi, but the expansion circuit only needs the compressed air entering the first expander stage 3E1 to be 800 psi for the expansion circuit to generate 10 MW, then a regulator 305, such as that shown in FIGS. 3A and 3B in the compressed air supply line 317 leading from the air storage 303, can be used to throttle the compressed air exiting the air storage 303 down to 800 psi throughout the period of electrical generation. In this mode, the expansion circuit starts in the same manner as described above for the Sliding Pressure Mode, but it never reaches the point where the first expander stage 3E1 gets bypassed, because the electrical power generation is manually stopped before the pressure of the compressed air in the air storage 303 falls to the predetermined pressure that would trigger the bypassing of the first expander stage 3E1 as described above.

In order to avoid the inefficiencies associated with throttling as discussed above, while maintaining the compressed air entering the pre-heater heat exchanger 319 at a predetermined constant pressure, a hydraulic fluid, such as water, can be pumped from a water tank 306, as shown in FIGS. 3A and 3B, into the air storage at the predetermined pressure and at a rate sufficient to prevent a drop in the pressure of the compressed air in the air storage 303 as the compressed air is fed to the expander stages 3E1, 3E2, 3E3, 3E4, 3E5, 3E6. For example, if it is desired to maintain the pressure of the compressed air in the air storage 303 at 800 psi, a water pump 307 capable of pumping water at 800 psi and at a rate sufficient to maintain the compressed air at 800 psi can be used. Since the energy required to run such a water pump 307 is less than the energy that can be produced by heating the compressed air as it is expanded through the expander stages 3E1, 3E2, 3E3, 3E4, 3E5, 3E6 of the present invention, the full energy benefit of the compressed air in the air storage 303 can be obtained while still producing additional electricity from the generator without resorting to the Sliding Pressure Mode.

Using the secondary heat to heat the compressed air up to a predetermined temperature, which may be nearly as high as the exhaust gas temperature of the gas turbine 301 supplying the secondary heat (depending upon losses that occur in transferring heat from the exhaust gas and to the compressed air) prior to such compressed air entering each expander stage 3E1, 3E2, 3E3, 3E4, 3E5, 3E6 results in the ability to generate more electric power from the same mass of compressed air in the air storage 303 than if the compressed air were not heated prior to entering each of the expander stages 3E1, 3E2, 3E3, 3E4, 3E5, 3E6. This also means that by using such inter-stage heating as described in the present invention, a smaller volume of air storage 303 and/or fewer air storage tanks could provide the same electrical power generation as a similar system in which the compressed air is heated up to the same temperature before the first expander stage, but not before any subsequent expander stages. Likewise, pumping water into the air storage 303 with a high pressure pump 307 to maintain the pressure in the air storage 303 at a pre-determined pressure until all of the compressed air has been driven out of the air storage 303 results in the ability to generate more electric power from the same mass of compressed air in the air storage 303 than can be can be generated by allowing the air storage 303 to "bleed down", as in the case of the Sliding Pressure Mode. This also means that by introducing high pressure water into the air storage 303 as described in the present invention, a smaller volume of, and/or fewer, air storage tanks could provide the same electrical power generation as a similar system in which the compressed air pressure simply bleeds down to ambient as the expander stages 3E1, 3E2, 3E3, 3E4, 3E5, 3E6 extract work from the compressed air.

In fact, by using secondary heat to heat the compressed air up to a predetermined temperature prior to such compressed air entering each expander stage 3E1, 3E2, 3E3, 3E4, 3E5, 3E6, as described above, and by pumping water into the air storage 303 with a high pressure pump 307 to maintain the pressure in the air storage 303 at a pre-determined pressure, as described above, the present embodiment of the present invention can produce the same megawatt hours of electrical power with one-fifth of the air storage volume that would be required to produce that amount of electrical power if no secondary heat were used to heat the compressed air up to a predetermined temperature prior to such compressed air entering each expander stage, and if no pumping of water into the air storage 303 with a high pressure pump 307 were done to maintain the pressure of the compressed air in the air storage 303 at a pre-determined pressure. Since the cost of the air storage 303 represents more than half of the cost of a typical CAES system for those installations where neither a cavern, nor other suitable geologic storage such as porous media, is available to provide air storage 303, this reduction represents a substantial reduction in the initial cost of implementing HOMC at an existing gas turbine site.

Those skilled in the art will also appreciate that the present embodiment of the present invention is also capable of being operated in hybrid modes, such as starting and operating the expansion circuit as described for the Sliding Pressure Mode, but then closing the air flow control valve in the compressed air supply line leading from the air storage when the pressure of the compressed air in the air storage reaches a predetermined minimum pressure. Likewise, the present embodiment of the present invention is capable of starting and operating the expansion circuit as described for the Regulated Pressure Mode, but then shifting to the Sliding Pressure Mode when the pressure of the compressed air in the air storage reaches a predetermined minimum pressure.

Figure 4A:
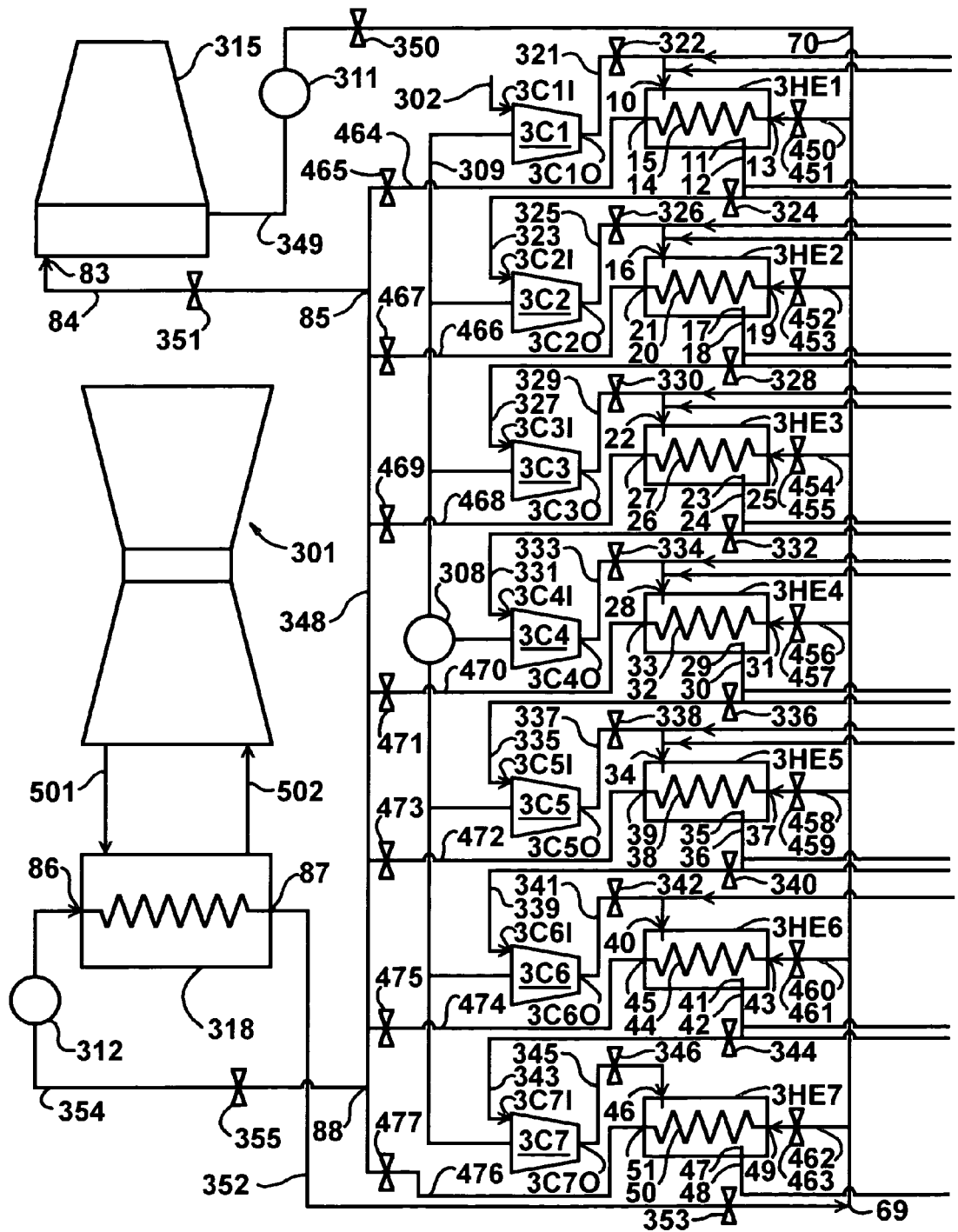
FIGS. 4A and 4B are a schematic drawing of the first alternate embodiment in which the source of secondary heat is a simple cycle gas turbine.
Figure 4B:
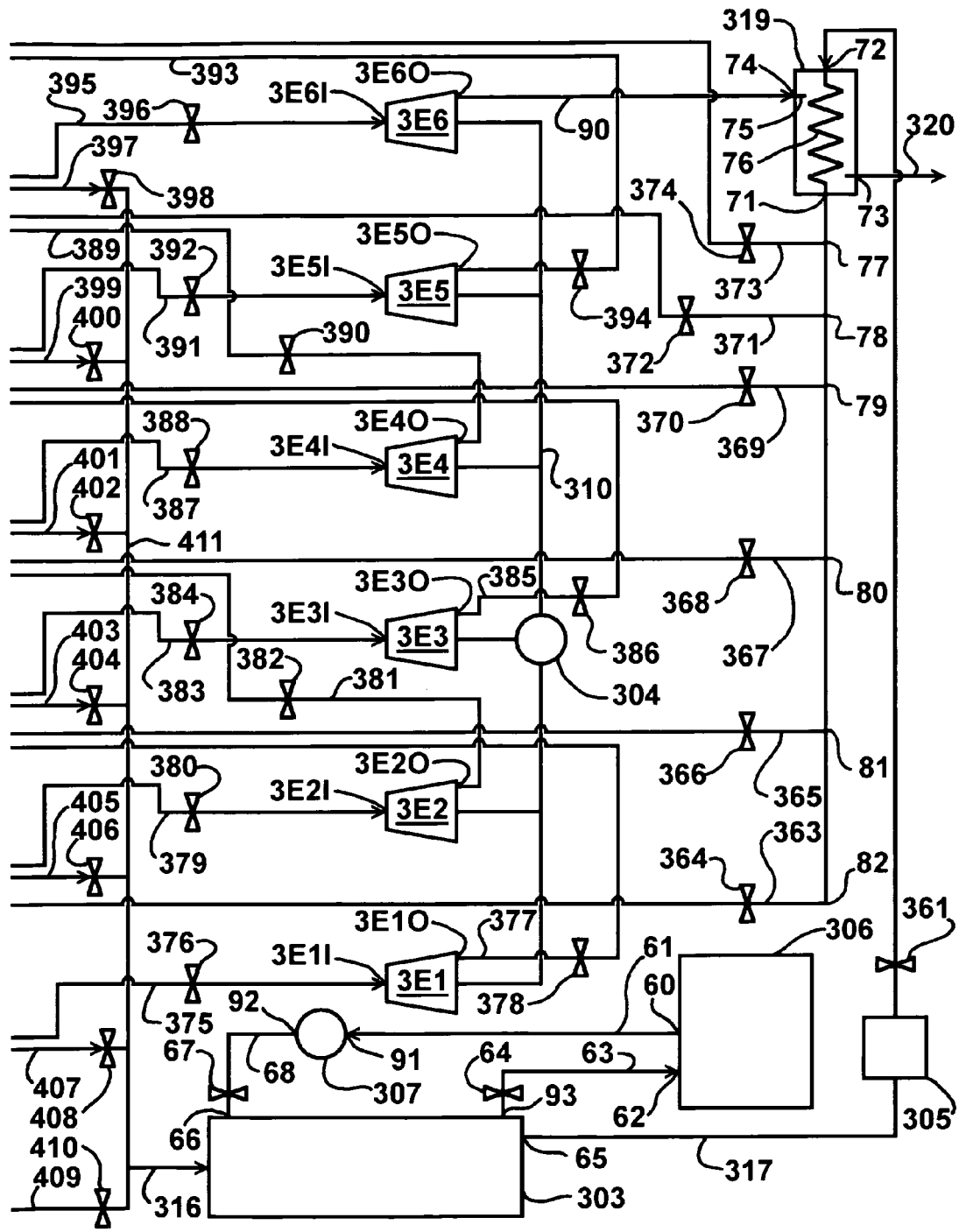

A first alternate embodiment of the present is shown in FIGS. 4A and 4B which is similar to the preferred embodiment, except that rather than transferring heat from the exhaust of a gas turbine 301 to the heat transfer fluid (hot water) using an air to liquid heat exchanger mounted in the gas turbine exhaust case, the exhaust gas from the gas turbine 301 is ducted 501 over to the location of the HOMC, where it goes through an exhaust-gas-to-water heat exchanger 318 and is then returned to the gas turbine exhaust through a return duct 502. Optionally, to eliminate the need for an exhaust system on the HOMC system at all, the expander exhaust 320 can be added to the return duct 502. The heat transfer fluid, or hot water, from the gas turbine exhaust heat exchanger 318 is then used to heat the compressed air entering the expander stages 3E1, 3E2, 3E3, 3E4, 3E5, 3E6 in the same manner as described previously with respect to the preferred embodiment. This first alternate embodiment eliminates the need for the addition of high pressure piping to the plant operators site, while also minimizing the effect on the plant operator's existing gas turbine 301. In all other respects, the first alternate embodiment of the present invention operates in the same manner as described above for the preferred embodiment. Accordingly, the first alternate embodiment of the present invention can be operated in the Sliding Pressure Mode, the Regulated Pressure Mode, and the hybrid modes discussed above.

Figure 5A:
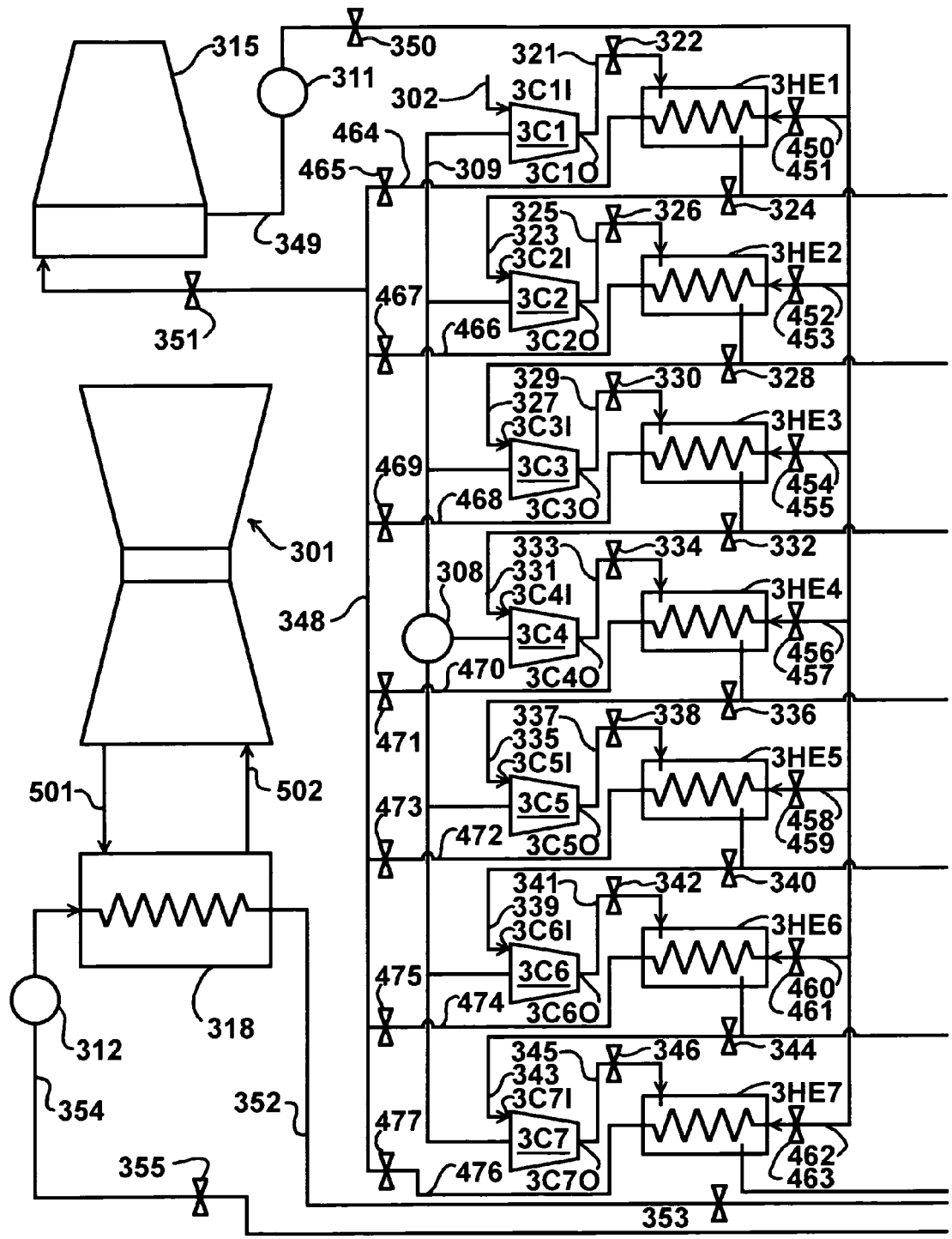
FIGS. 5A and 5B are a schematic drawing of the second alternate embodiment in which the source of secondary heat is a simple cycle gas turbine.
Figure 5B:
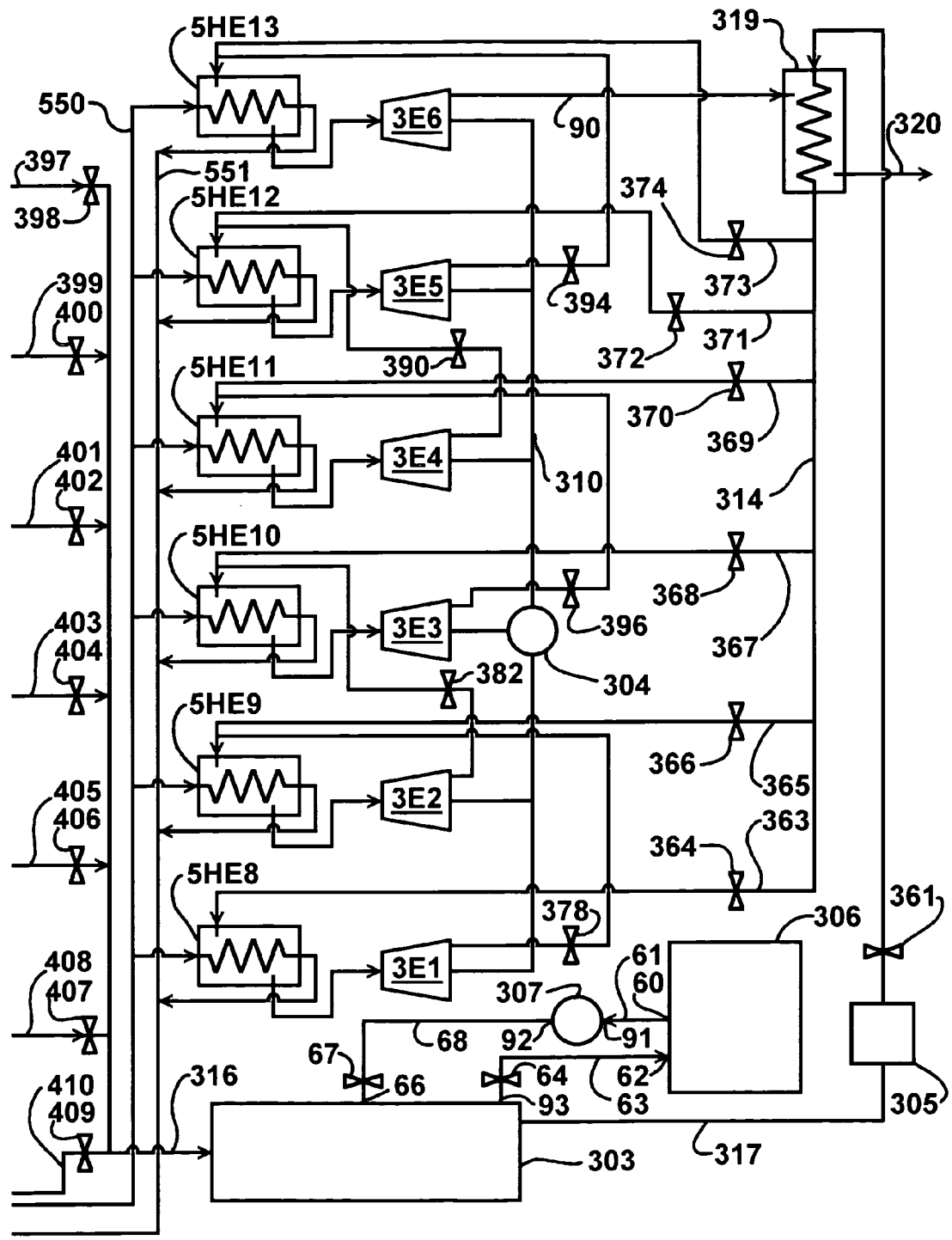

A second alternate embodiment of the present invention is shown in FIGS. 5A and 5B which is similar to the first alternate embodiment, except that in this embodiment 1) the gas turbine exhaust is ducted to an exhaust-gas-to-air heat exchanger instead of an exhaust-gas-to-water heat exchanger, 2) the expansion circuit is decoupled from the heat exchangers 3HE1, 3HE2, 3HE3, 3HE4, 3HE5, 3HE6, 3HE7 used in the compression circuit such that the compression circuit has its own manifolds 347, 348 and heat exchangers 3HE1, 3HE2, 3HE3, 3HE4, 3HE5, 3HE6, 3HE7, and the expansion circuit has its own manifolds 550, 551 and six air-to-air heat exchangers 5HE8, 5HE9, 5HE10, 5HE11, 5HE12, 5HE13, and one pre-heater heat exchanger 319. Since the heat exchangers used in the compression circuit use a liquid coolant, they cannot double as heat exchangers for the expansion circuit due to the differences in the heat transfer medium used. Accordingly, a separate bank of air-to-air heat exchangers (5HE8, 5HE9, 5HE10, 5HE11, 5HE12, 5HE13) is used exclusively with the expander stages (3E1, 3E2, 3E3, 3E4, 3E5, 3E6). Such a system may be desirable if a power plant needs to generate additional megawatts of power ("Power Augmentation Mode") for a sustained period of time (i.e. days rather than hours) as described in greater detail below. As those skilled in the art will readily appreciate, the Power Augmentation Mode can also be used with the preferred embodiment and the first alternate embodiment if separate heat exchangers are provided for the compressor circuit and the expander circuit in the manner shown for the second alternate embodiment.

The compression circuit of the second alternate embodiment of the present invention is the same as described for the preferred embodiment, and, except for the changes described with respect to the heating of the hot water described in the first alternate embodiment, the heat transfer fluid supply circuit is also the same. Likewise, the expansion circuit of the second alternate embodiment of the present invention is similar to that described for the preferred embodiment, but in the second alternate embodiment of the present invention, the eighth heat exchanger 3HE8 replaces the sixth heat exchanger 3HE6, the ninth heat exchanger 3HE9 replaces the fifth heat exchanger 3HE5, the tenth heat exchanger 5HE10 replaces the fourth heat exchanger 3HE4, the eleventh heat exchanger 5HE11 replaces the third heat exchanger 3HE3, the twelfth heat exchanger 5HE12 replaces the second heat exchanger 3HE2, and the thirteenth heat exchanger 5HE13 replaces the first heat exchanger 3HE1. Other than the replacement of the foregoing heat exchangers in the operation of the expansion circuit, the expansion operation is similar to that described for the preferred embodiment of the present invention. Accordingly, the second alternate embodiment of the present invention can be operated in the Sliding Pressure Mode, the Regulated Pressure Mode, and the hybrid modes discussed above. In addition, because the second embodiment of the present invention has heat exchangers 5HE8, 5HE9, 5HE10, 5HE11, 5HE12, 5HE13 that are dedicated to the expansion operation, the compression operation and the expansion operation can operate simultaneously in the Power Augmentation Mode as described below, unlike the systems used in the preferred embodiment and the first alternate embodiment of the present invention.

Since these embodiments use secondary heat from a heat source, such as an existing gas turbine, that would otherwise be released to the atmosphere, these embodiments output more megawatts of energy than they consume. For example, if there is sufficient exhaust gas available from the gas turbine 301, or another source secondary heat, the compressed air flowing through heat exchangers 5HE8, 5HE9, 5HE10, 5HE11, 5HE12, 5HE13 to a temperature of 850° F., the efficiency of the second alternate embodiment of the present invention is 1.4 (where the energy in the secondary heat is not included as energy input in the calculation of efficiency). If there is sufficient exhaust gas available from the gas turbine to heat the compressed air flowing through heat exchangers 5HE8, 5HE9, 5HE10, 5HE11, 5HE12, 5HE13 to a temperature of least 1050° F., the efficiency of this embodiment is 1.65, using the same formula for efficiency calculation.

As those skilled in the art will readily appreciate, as long as the efficiency is greater than 1.0, the second alternate embodiment of the present invention can be used for power augmentation ("Power Augmentation Mode") by operating both the compression operation and the expansion operation simultaneously, because the expansion operation, using secondary heat, produces more power than the compression operation and parasitic equipment consumes. For example, if the second alternate embodiment of the present invention is added to an existing General Electric 7FA ("GE 7FA") simple cycle gas turbine that is being used as a "peaker" (i.e. used when demand for electrical power peaks above that level that can be supplied by base-load generation), it will provide all of the benefits associated with an energy storage system with an efficiency of 1.65. In addition, if it is desired to operate the present invention in a sustained Power Augmentation Mode, since both the compressor stages 3C1, 3C2, 3C3, 3C4, 3C5, 3C6, 3C7 and the expander stages 3E1, 3E2, 3E3, 3E4, 3E5, 3E6 can be run on a common shaft, with clutches, through the motor/generator 304, 308 such that a portion of the torque generated by the expander stages 3E1, 3E2, 3E3, 3E4, 3E5, 3E6 is used to drive the compressor stages 3C1, 3C2, 3C3, 3C4, 3C5, 3C6, 3C7 and the remainder is used to drive the generator 304 such that the compressor stages charge the air storage 303 at the same rate the expander stages consume compressed air from the air storage 303 (provided that the pressure of the compressed air in the air storage is at least 800 psi), and since the efficiency of this embodiment is 1.65, the present invention will produce 1.65 MW for each 1 MW of energy it consumes.

For example, since a GE 7FA produces approximately 1000 lb/sec exhaust flow, and a 10.3 MW version of the present embodiment needs 180 lbs/sec to produce its rated power, approximately 57 MW of energy storage power can be generated for 4 hours (if the air storage 303 is full and at a pressure of 1200 psi) from the secondary heat of a GE 7FA, and when the air storage 303 reaches 800 psi, the HOMC can be operated in a Power Augmentation Mode, where the expander stages, less the energy required to drive the compressors, generate a net output of 4.2 MW while running simultaneously, and 22 MW can be generated indefinitely, without using any of the compressed air in the air storage 303, as long as the gas turbine 301 is running and producing exhaust gas. Therefore, while a GE 7FA itself produces 194 MW, an additional 57 MW can be produced by expansion of the compressed air through the expander stages as long as the pressure of the compressed air in the air storage 303 is above 800 psi. Once the pressure of the compressed air in the air storage 303 falls to 800 psi, the compressor stages can be run to deliver compressed air at an 800 psi discharge pressure, (not 1200 psi because the compressed air is going to be expanded as fast as it is compressed), and the power consumed by the compression operation is reduced because the last compression stage, the stage that normally compresses 800 psi air up to 1200 psi, is not engaged because there is no need to compress the air in the air storage 303 above 800 psi. The second alternate embodiment of the present invention in the Power Augmentation Mode on a GE 7FA can produce a net 22 MW of additional power for period of time that is not limited by the volume of the air storage 303, if desired, representing an 11% increase in net power from the power plant, or a 11% reduction in heat rate.

As a means of illustrating the advantages of the HOMC cycle disclosed herein, a comparison of the relative energy output and the "round trip" efficiency obtained from the CAES2 and HOMC cycle is shown below given 1) the same initial conditions (air storage, having a volume equal to 75,848 ft$^3$ is full of compressed air) and 2) access to the same temperature exhaust (1050° F. in the case of CAES2 and HOMC).

The volume of the air storage tank in this example was calculated by taking the change in the mass of compressed air that must exit the air storage to produce 4 hours of 10 MW output (as discussed below) divided by the change in density of the compressed air remaining in the air storage tank. The change in mass exiting the air storage tank is the density of the compressed air at 1200 psi (from standard thermodynamic tables, at 80° F.) minus the density of the air in the tank at 14.7 psi (from standard thermodynamic tables, at 80° F.) which equals a density change of 5.81 lb/ft$^3$. The change in mass of the compressed air exiting the air storage tank is the mass flow (32 lb/sec, which produces 10 MW as shown below) multiplied by the output time of 4 hours (14,400 seconds), or 460,800 lbs of air. Dividing this change in mass (460,800 lbs) by the density change (5.81 lb/ft$^3$) yields an air storage volume of 79,292 ft$^3$ to produce 10 MW for 4 hours. (This calculated air storage volume was further reduced to 75,848 ft$^3$ as described below.) With the change in mass of compressed air being known (which is also function of the air storage volume), one can calculate how long it would take for compressor flowing 28 lbs/sec to fill the air storage by dividing the change in the mass of compressed air (460,800 lbs) by the flow rate (28 lbs/sec), or 16,457 seconds (i.e. 4.57 hours). Therefore, it would take 4.57 hours to fill an air storage having a volume of 79,292 ft$^3$ from 14.7 psi to 1200 psi. The compressor pump power and energy is calculated as shown in Table 1 below:

TABLE 1

Compressor Power
Flow = lbm/s
Compressor WITH Intercooling (GIVEN - 80° F. Coolant)

| Stage | P In [psia] | P Out [psia] | P Ratio | T In [° F.] | T Out [° F.] | h In [Btu/lbm] | h Out [Btu/lbm] | Δh [Btu/lbm] | Power In Btu/s | Power In MW |
|---|---|---|---|---|---|---|---|---|---|---|
| 1 | 14.7 | 33 | 2.22 | 90 | 244 | 131 | 169 | 37 | 1038 | 1.10 |
| 2 | 32.7 | 53 | 1.63 | 100 | 197 | 134 | 157 | 23 | 647 | 0.68 |
| 3 | 53.3 | 130 | 2.44 | 100 | 284 | 134 | 178 | 44 | 1235 | 1.30 |
| 4 | 130.0 | 273 | 2.10 | 100 | 257 | 134 | 172 | 38 | 1059 | 1.12 |
| 5 | 273.0 | 514 | 1.88 | 100 | 323 | 134 | 188 | 54 | 1507 | 1.59 |
| 6 | 514.4 | 816 | 1.59 | 100 | 189 | 134 | 155 | 21 | 600 | 0.63 |
| 7 | 800.0 | 1200 | 1.47 | 100 | 172 | 134 | 151 | 17 | 478 | 0.50 |
| To Air Storage | | | | 90 | | | | Σ | 6564 | 6.92 |

Assuming that the compression process for the Smart-CAES, CAES2 and HOMC cycles is equivalent, (i.e. that they all use similar type turbo-compressors with intercooling), the charging power required by each stage, assuming isotropic compression, (which is a reasonable approximation where intercooled compressor stages are used), the compressor power is the change in enthalpy per stage of compression which is driven by the temperature rise, which is related to the pressure ratio by the equation (TOut/Tin)=(Pout/Pin)(k−1)/k, where k is 1.4, the gas constant for air. Using the first stage as an example, TOut=Tin*(Pout/Pin)(k−1)/k, where Tin=311° K (90° F.), Pout=33 psia, and Pin=14.7 psia, Tout=311*(33/14.7)(1.4−1)/1.4=394° K or (244° F.). The outlet temperature of each of the other compressor stages in Table 1 is calculated the same way, and the pressure ratio is a given value driven by the manufacturer of the air compressor's aerodynamics. For the type of compressors in this example, each stage has a pressure ratio of ~2.0. The total pump power any time the pressure in the tank is at 800 psi or above is 6.92 MW.

To charge a 79,292 ft³ tank full with 1200 psi air as described with respect to the present embodiments, only the first stage initially compresses air, using 1.1 MW, until the compressed air in the air storage reaches 33 psi, at which time the exit flow of the first stage compressor is redirected from the air storage to the inlet of the second compressor stage. The load for the second compressor stage is 0.68 MW, for a total compression load of 1.78 MW through the first two stages. This process continues as the compressed air in the air storage reaches the output pressure of the current compressor stage until finally, the compressed air in the air storage is at 815.6 psi, at which point the flow coming out of the 6th compressor stage is redirected from the air storage to the inlet of the 7th, and final, compressor stage. At this point, the power required to run all seven compressor stages is 6.92 MW. In this example, throughout the time any of the compressor stages is running, the mass flow to the air storage is constant at 28 lbs/sec, while the pressure is increasing. Typically, these types of compressor stages are run in applications having constant inlet and exit pressures, where there is no need to modulate the compressed air from one stage to another. Since the use of these compressor stages in the present embodiment is not a typical run profile for these types of compressor stages, there is a need to modulate the compressed air from one compressor stage to another as described above. Also, inlet guide vanes and exit guide vanes may be incorporated into the present embodiment so that as the pressure within each stage is changing, the efficiency of the compressor stage can be maximized.

To calculate the total energy consumed while pumping the tank from 14.7 psia to 1200 psia, an integration process is used which sums the energy used by all of the compressor stages. Each stage's charging time is calculated by a process similar to that described above for the first compressor stage, where the change in density for any given stage is multiplied by the total volume of the air storage and then divided by the compressor mass flow rate of 28 lb/sec. Then, each compressor stage's energy consumption is simply that compressor stage's power consumption multiplied by the charging time for that particular compressor stage. Since the power level for charging the tank from 32.2 psi to 53.3 psi in the example below, is the sum of the first and second power level, or 1.78, the energy required to charge the air storage from 32.2 psi to 53.3 psi is 1.78 MW multiplied by the time, 0.08 hrs, or 0.1 MWh. Using this technique for all of the compressor stages and summing, the total energy required to charge the tank from tank from 14.7 psi to 1200 psi is calculated to be 26.6 MWh, as shown in Table 2 below:

TABLE 2

Integration Process Summing

| | Compressor Power | | 28 lb/s Compressor Flow | | |
|---|---|---|---|---|---|
| Stage | Pressure 1 Psia | Pressure 2 psia | Power MW | Time hrs | Energy MW-hr |
| 1 | 14.7 | 32.7 | 1.1 | 0.07 | 0.1 |
| 2 | 32.7 | 53.3 | 1.78 | 0.08 | 0.1 |
| 3 | 53.3 | 130 | 3.08 | 0.30 | 0.9 |
| 4 | 130 | 273 | 4.2 | 0.55 | 2.3 |
| 5 | 273 | 514.4 | 5.79 | 0.93 | 5.4 |
| 6 | 514.4 | 815.6 | 6.42 | 1.16 | 7.5 |
| 7 | 815.6 | 1200 | 6.92 | 1.48 | 10.3 |
| | | | Σ | 4.57 | 26.6 |

The expansion cycle is assumed to have 84% isoentropic efficiency. With this assumption, and using the same rationale explained in the compressor stages power calculation, an energy output through all of the expander stages, with interstage reheat, yields an output of 11.3 MW, as shown in Table 3 below:

TABLE 3

800 psi Operating Expander WITH Interheating - 1050° F. Exhaust
Flow = 32 lbm/s

| Stage | T In [° F.] | T Out [° F.] | P In [psia] | P Out [psia] | P Ratio | h In [Btu/lbm] | h Out [Btu/lbm] | Δh [Btu/lbm] | Power Out Btu/s | Isentropic Power Out MW |
|---|---|---|---|---|---|---|---|---|---|---|
| 1 | 1011 | 830 | 816 | 514 | 0.63 | 362 | 314 | 47 | 1516 | 1.60 |
| 2 | 1028 | 782 | 514 | 273 | 0.53 | 366 | 302 | 64 | 2050 | 2.16 |
| 3 | 1023 | 740 | 273 | 130 | 0.48 | 365 | 291 | 74 | 2356 | 2.49 |
| 4 | 1019 | 687 | 130 | 53 | 0.41 | 363 | 278 | 86 | 2743 | 2.89 |
| 5 | 1014 | 822 | 53 | 33 | 0.61 | 362 | 312 | 50 | 1599 | 1.69 |
| 6 | 1027 | 724 | 33 | 15 | 0.45 | 366 | 287 | 79 | 2520 | 2.66 |
| | AVG | 724 | | 84% Efficient Power Out MW 11.3 | | | | Σ | 12785 | 13.49 |

The time required to deplete the pressure of the compressed air in this air storage from 1200 psi to 800 psi during the expansion cycle is a function of the change in density of the compressed air at those two pressures at 80° F., which from standard thermodynamic tables equals 1.88 lb/ft³. Multiplying this change in density (1.88 lb/ft³ by the air storage volume, 79,292 ft³, gives the change in mass of the compressed air in the air storage, or 149,440 lbs. Dividing this change in mass by the expander flow rate of 32 lbs/s yields the time it takes to deplete the pressure of the compressed air in the air storage from 1200 psi to 800 psi, that being 4,670 seconds, or 1.3 hours. In other words, the expander cycle can run for 1.3 hours with an output of 11.3 MW before the pressure of the compressed air in the air storage falls to 800 psi. At this point the hydraulic pump is engaged to pump a hydraulic fluid, preferably water, to drive out the remainder of the compressed air in the air storage (311,360 lbs) for an additional 2.7 additional hours with a net power output from the expander cycle of 10 MW. The pump power required to fill the 79,292 ft³ tank with 800 psi hydraulic fluid was determined from pump manufacturer specifications and a fill time of 2.7 hours (balance of time left to deliver power for 4 hours, 2.7=4−1.3) which yields a pump flow rate of 3516 gpm at 800 psi and atmospheric inlet head and a pump power of 1.3 MW. The optimum output is a constant output (10 MW) for 4 hours, so for the first 1.3 hours, the expander can actually operated at a 12% lower flow rate and produce 10 MW, which actually reduces the required volume of the air storage to 75,848 ft³ and the required input energy to 25.4 MW. With a power output of 10 MW for 4 hours, or an energy output of 40 MWh for the HOMC system, the round trip efficiency is 1.57 (i.e. the HOMC system returns 1.57 times the energy it consumes).

In the example of the CAES2 cycle, assuming it has the same expander flow rate, the power delivery cycle is over at 1.3 hours, because there is no provision in the CAES2 cycle to run at inlet pressures below 800 psia (i.e. it is time to recharge the tank). In the HOMC cycle of the present embodiment, the expander cycle can continue to run until all of the air is driven out of the tank by the hydraulic fluid. The output power level of the CAES2 cycle is shown in Table 4, using the exact same assumptions that outlined above for the HOMC cycle in Table 3. As can be clearly seen, the power output for the CAES2 system is reduced from 10 MW to 6.8 MW and the time it can produce power is reduced from 4 hours to 1.3, for a total energy output of 8.84 MWh. However, the total energy consumption of the CAES2 system is also reduced, because the compressor only has to charge the air storage from 800 psi to 1200 psi, which takes the same power (6.92 MW from Table 1) as the HOMC cycle but only for 1.48 hours (Table 2), or for a total energy input of 10.24 MWh input, yielding a "round-trip" cycle efficiency of 0.86 (8.84 MWh/10.24 MWh) for the CAES2 cycle.

TABLE 4

CAES2 Cycle Power Output
CAES 2 - Expander WITHOUT Inter-stage heating - 1050° F. Exhaust
Flow = 32 lbm/s

| Stage | T In [° F.] | T Out [° F.] | P In [pisa] | P Out [psia] | P Ratio | h In [Btu/lbm] | h Out [Btu/lbm] | Δh [Btu/lbm] | Power Out Btu/s | Power Out MW |
|---|---|---|---|---|---|---|---|---|---|---|
| 1 | 954 | 780 | 816 | 514 | 0.63 | 347 | 301 | 45 | 1452 | 1.53 |
| 2 | 780 | 574 | 514 | 273 | 0.53 | 301 | 249 | 52 | 1658 | 1.75 |
| 3 | 574 | 377 | 273 | 130 | 0.48 | 249 | 201 | 49 | 1563 | 1.65 |
| 4 | 377 | 189 | 130 | 53 | 0.41 | 201 | 155 | 46 | 1458 | 1.54 |
| 5 | 189 | 104 | 53 | 33 | 0.61 | 155 | 135 | 20 | 647 | 0.68 |
| 6 | 104 | −11 | 33 | 15 | 0.45 | 135 | 107 | 28 | 882 | 0.93 |
| | | | | 84% Efficient Power Out MW 6.8 | | | | Σ | 7660 | 8.08 |

Table 5 shows a summary of the relative performance of the HOMC cycle vs the CAES2 cycle given the same temperature access, the same air storage volume, and the same expander cycle mass flow.

TABLE 5

Cycle Comparison Given Fixed Air Storage Volume (75,848 ft³) and Access to 1050° F. Heat

| Cycle | Power | Duration | Energy Out | Energy In | Round Trip Efficiency |
|---|---|---|---|---|---|
| HOMC cycle | 10 MW | 4 hours | 40 MWh | 25.4 MWh | 1.57 |
| CAES2 | 6.8 | 1.3 | 8.8 MWh | 10.2 MWh | 0.86 |

As can be clearly seen, the round trip electrical efficiency of the HOMC cycle is 1.8 times the efficiency of the CAES2 cycle, the total energy output of the HOMC cycle is 4.5 times the energy output of the CAES2 cycle, and the HOMC cycle can sustain power production for 3 times as long as the CAES2 cycle. As those skilled in the art will readily appreciate, even if a hydraulic system similar to that used in the present embodiment were incorporated into the CAES2 cycle to pump all of the air out of the air storage, for the same mass flow the HOMC cycle has a much higher power conversion, 10 MW, vs 6.8 MW, representing 1.5 times as much power.

Where the energy storage and retrieval system of the present invention will be used in conjunction with a source of secondary heat, such as an existing gas turbine, located on a navigable waterway, the present invention can be constructed on a barge at an offsite manufacturing facility, as this is the most economical method to produce and package this system. Once the construction has been completed, the barge can be floated to the site of the gas turbine, anchored, and the necessary connections made to transfer secondary heat from the gas turbine to the present invention. Where the energy storage and retrieval system of the present invention will be used in conjunction with a secondary heat source at a site not accessible by a navigable waterway, the present invention can be constructed at an offsite manufacturing facility with the high pressure tanks preferably prefabricated in modules and the remaining system components mounted on one or more skids constructed so that the entire energy storage and retrieval system can be transported by barge to a port near the site, and then transported to site.

By contrast, existing CAES2 and SmartCAES systems have been constructed on-site, with each of the components built off-site and then shipped to site where they are erected. For most of the components involved, the additional costs incurred by on-site construction are relatively small, with the notable exception of the piping system. For example, when the piping system is constructed at site, a welding process, an x-ray inspection process, a rework and re-inspection process and a final testing process need to be developed and executed in the field in order to achieve the required pressure vessel approval under the standards of the American Society of Mechanical Engineers ("ASME"). If these processes are executed in a controlled environment dedicated to manufacturing, not only are costs reduced by avoiding local labor and non-productive issues at site, but the ASME approval processes allow for more aggressive design which can result in thinner-walled piping, resulting in further cost savings. By constructing the present invention on the same barge that it will permanently operate from, the entire energy storage and retrieval system can be completed at the manufacturing facility with no critical welding in the field.

As those skilled in the art will readily appreciate, combined cycle power plants have overall efficiencies that are so high that, there is likely not enough waste heat available to generate the amount of energy that would justify the cost of an HOMC system. Since the addition of any parasitic power generation system (i.e. a system that requires that additional fuel be burned to generate additional power) to a combined cycle power plant would likely reduce the overall efficiency of the power plant more than simply burning that same amount of fuel via duct burners to add more heat to the heat recovery steam generator ("HRSG") to produce more steam for the steam turbine, owners of such plants typically do not add parasitic power generation systems to existing combined cycle power plants. The total electrical energy that can be produced by a combined cycle plant is typically limited by the generator that the gas and steam turbines drive, so that once the generator reaches its limit, the burning of additional fuel will not produce additional electrical power. Accordingly, if peak energy demands exceed the generation capacity of a combined cycle plant, and the primary goal is to meet that peak demand, adding an HOMC system may be viable, even if operated as a parasitic power generation system.

Figure 6:
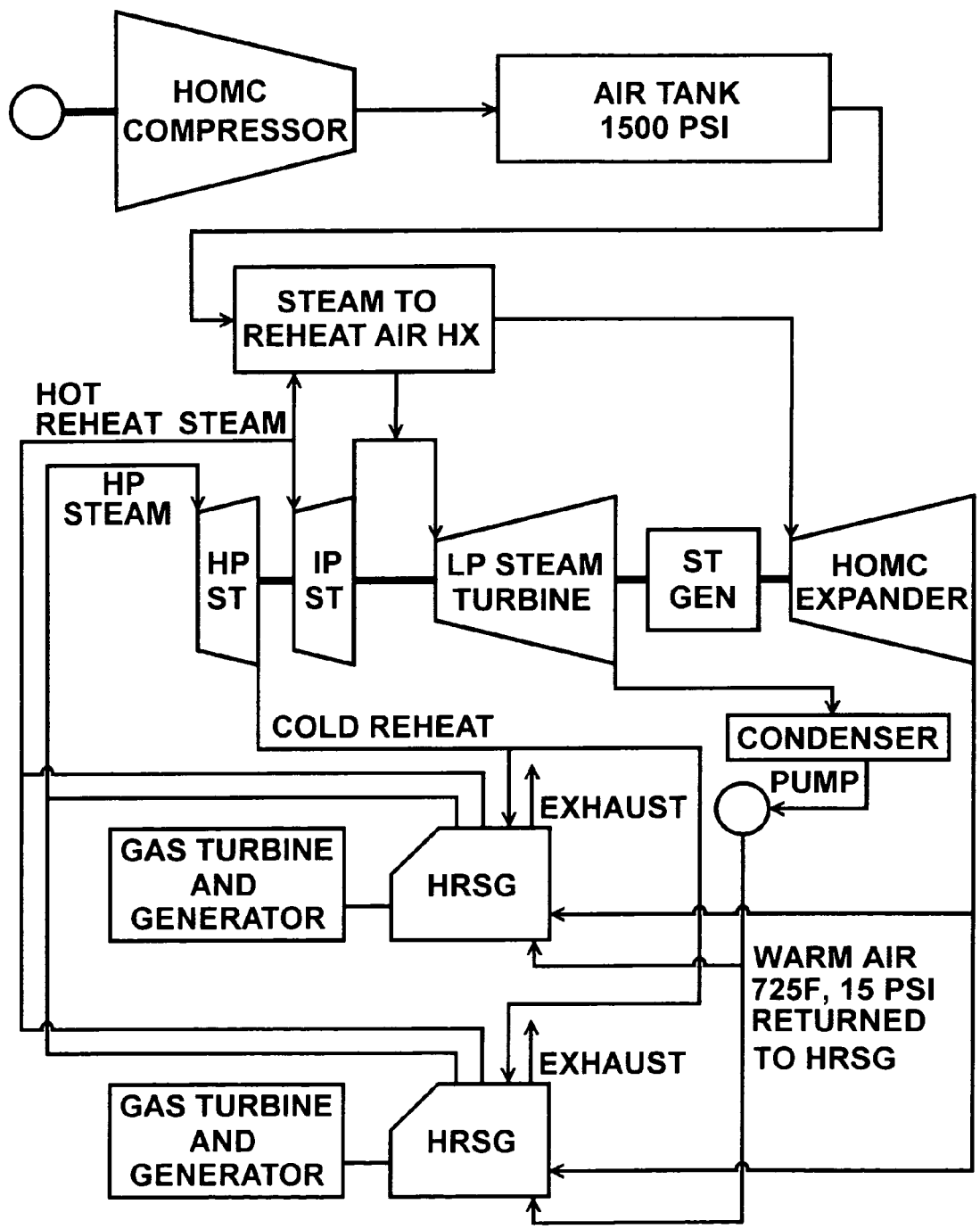
FIG. 6 is a schematic drawing of the HOMC system integrated with a steam cycle of a combined cycle power plant.

Accordingly, although the present invention has been shown and described with respect to an existing simple cycle gas turbine, the present invention can be incorporated into an existing combined cycle gas turbine power plant, as shown in FIG. 6. In this system, the secondary heat provided to the present invention is received from the existing heat recovery steam generators ("HRSG"), and the second heat exchange circuits can be supplied by tapping into the existing steam supply lines in parallel with one or more stages of the steam turbine. While obtaining secondary heat for the present invention in this manner will tend to reduce the overall efficiency of the steam turbine of the combined cycle power plant, the power plant operator can modify the operating profile of the combined cycle power plant to minimize any drop in power generation from the combined cycle gas and steam turbines in those situations where the ability to generate electrical energy in excess of that which can be produced by the generator of the combined cycle power plant, or the ability to store compressed air energy for meeting a peak power demand, justifies such a reduction in overall drop in overall power plant efficiency. For example, many combined cycle power plants have existing duct burners that can be fired to deliver additional heat to the HRSG to provide additional steam to make up for that steam that is diverted from the steam turbine supply lines to heat the second heat exchange circuits of the plurality of heat exchangers. Alternatively, in-line burners could be added to provide heat, directly or indirectly, to the second heat exchange circuit of the plurality of heat exchangers of the HOMC to heat the compressed air as it flows between expander stages. Likewise, the same type of HOMC system could be added to the steam turbines used in coal-fired plants or nuclear plants to provide additional power in times of peak demand, or to store compressed air for future use in times of peak demand.

As those skilled in the art will readily appreciate, the present invention can be incorporated into other sources of secondary heat, such as the exhaust gas of coal-fired power plants. The present invention can also be incorporated into other heat sources such as the existing steam supply of steam turbines in coal-fired, oil-fired or nuclear power plants. Likewise, combustible gas byproducts, which are typically "flared" to dispose of them, or cleaned, dried and piped into a gas pipeline for sale, such as those produced by industrial processes like chemical plants, or biological processes like landfills, can be burned to produce the secondary heat to be supplied to the second heat exchange circuits of the heat exchangers of the present invention.

Additionally, the HOMC system of the present invention can be used with intermittent power producing systems such as solar, wind, wave and tidal power generation systems that produce substantial amounts of electrical power over long periods of time, but cannot be relied upon to produce large amounts or electrical power to meet peak demands. When used in conjunction with these types of systems, the HOMC system can use power produced by the intermittent power producing systems to store compressed air in an air storage as described herein, while electrical heating strips or other heat generation mechanisms may be used to heat the compressed air of the HOMC prior to entering the expander stages of the HOMC system.

Figure 7:
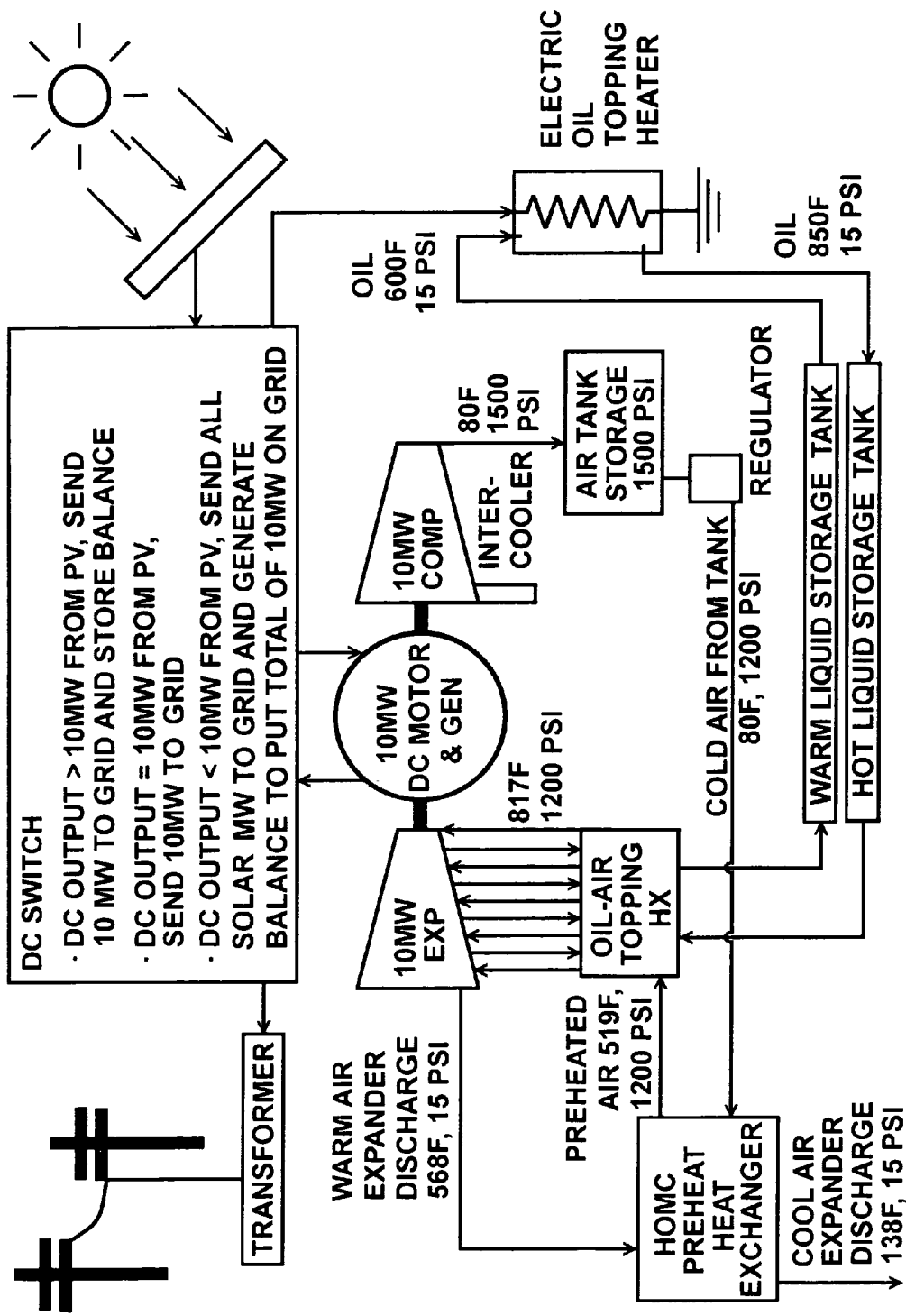
FIG. 7 is a schematic drawing of the HOMC system where the heat is supplied by an electric source coming from a photovoltaic solar plant.

FIG. 7 shows a schematic of the HOMC system of the present invention integrated into a photovoltaic solar plant. When the sun is shining, the operator can make a decision on how much solar energy to use to run the motor to drive the compressor stages to store compressed air depending on current and forecast market and weather conditions. The energy is stored in two forms: compressed air, and hot oil (like DowThermA®). Then, either during an intermittent period of sunshine or later in the day after the sun goes down, the HOMC expansion cycle is started to expand the compressed air. The hot oil is used to provide additional heat ("topping temperature") to the compressed air after the pre-heater brings the temperature of the compressed air close to the temperature of the expander exhaust.

Furthermore, as demand for electrical power has increased, grid controlling authorities have placed a higher value on fast responding generation, called "regulation", because the amount of intermittent generation, such as that from solar, wind, and waves, has been increasing and because intermittent generation can suddenly increase or decrease in output due to rapid changes in the environment. Power plants get paid more for regulation, and all assets being paid for as regulation are synchronized to the grid and are running at part load. The amount of regulation that power plants can sell is limited to the amount of output they can change within 10 minutes of receiving a request from the power grid. Currently, "energy batteries", which can respond to demand from the grid in milliseconds, are serving this market. As used herein, the term "energy battery" or "energy batteries" mean chemical batteries, capacitors, flywheels, and similar energy storage devices that can deliver additional electrical power instantaneously (i.e. within milliseconds rather than within seconds or minutes) in response to grid demand. However, energy batteries are limited in that they are energy neutral devices. For example, a 1 MW chemical battery typically has 1 hour of storage and is on the system at half charge, so that it can absorb 0.5 MW for up to one hour and discharge 0.5 MW for up to one hour. Battery systems typically have an AC-to-AC round trip efficiency of not more than 80%, therefore, on the energy absorption mode, it actually takes in 1.2 times as much energy to charge the battery as it returns when it discharges, or 0.6 MWh absorbed for every 0.5 MWh that it puts out. (This is routinely called "energy neutral" but in reality, it is not) These systems have a similar cost per MW as a HOMC system, however, for the same cost per MW, the HOMC system is designed to deliver energy for at least 4 hours and thus cost one-fourth of the cost of a chemical battery on a per MWh basis.

One advantage of CAES type systems is that they are inherently able to quickly change load by simply opening or closing flow control valves. A gas turbine, by comparison, typically can meet a requested grid load ("load follow") but with up to a five minute delay, whereas a CAES type plant has the ability to change load in 10 seconds and it can deliver hours (typically at least four hours) of energy, depending on the mass of compressed air that can be stored in the air storage. Consequently, when a very small battery is incorporated in the HOMC system of the present invention, the result is an energy storage and retrieval system that can deliver regulation on a millisecond basis, just like a chemical battery, but rather than being energy neutral, can deliver more energy to the grid than it consumes if the secondary heat is waste heat which is not accounted for in the compression cycle of the HOMC of the present invention.

Figure 8:
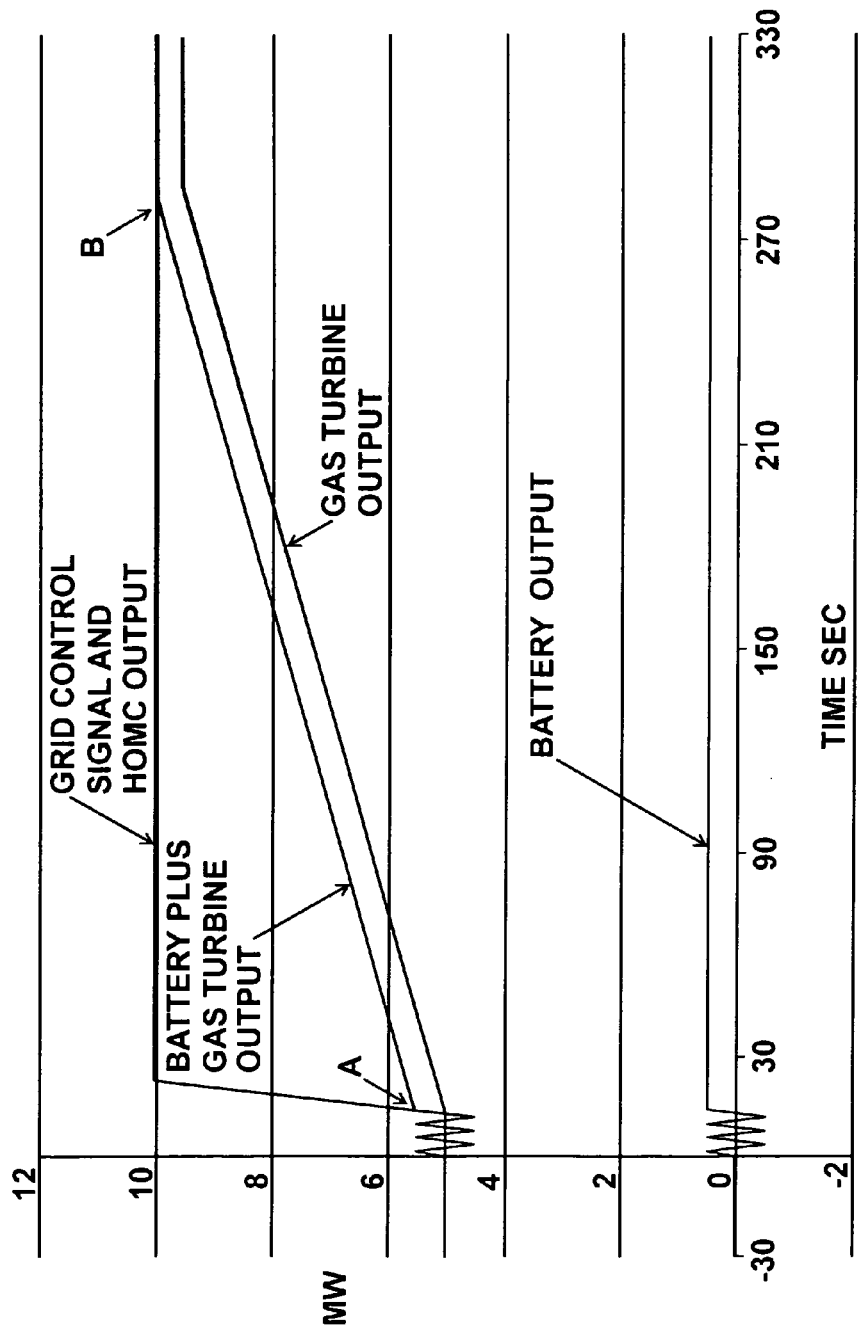
FIG. 8 is a graphical comparison of the output characteristics of a HOMC system in regulation mode compared to a battery.

An example of how a HOMC system could be used in a regulation mode, as compared to a battery, is shown in FIG. 8. Initially, the grid is stable at 5 MW at time zero, and the automatic grid control ("AGC") signal varies up and down 0.5 MW. The AGC signal can be changed every six seconds, so that often a gas turbine will not have reached the one requested output setpoint before the signal is again changed to another output setpoint. Being much faster, energy batteries will probably have reached the new setpoint within the six seconds between AGC signal output requests, and as such they are said to have "perfect regulation". For example, a chemical battery with a power rating of 1 MW for 1 hour is able to follow this demand curve, as is the HOMC with a 1 MW power rating, for 30 seconds. At 15 seconds, shown as point "A" in FIG. 8, the AGC gives a command to increase the power level to 10 MW. The HOMC system can follow that command exactly by ramping the mass flow of compressed air from half flow (5 MW) up to full flow 10 MW. The battery can contribute 0.5 MW, but falls short of being able to ramp to the 10 MW load request, since the battery would have to be ten times larger (and presumably ten times the cost) to meet the 10 MW demand from the AGC. By comparison, the gas turbine in this example takes about 5 minutes to ramp up to the 10 MW load (315 seconds). While the gas turbine may be able to ramp up by 10 MW in less than the 5 minutes shown in this example, it certainly cannot do so within the 6 second period between successive AGC signals.

Figure 9:
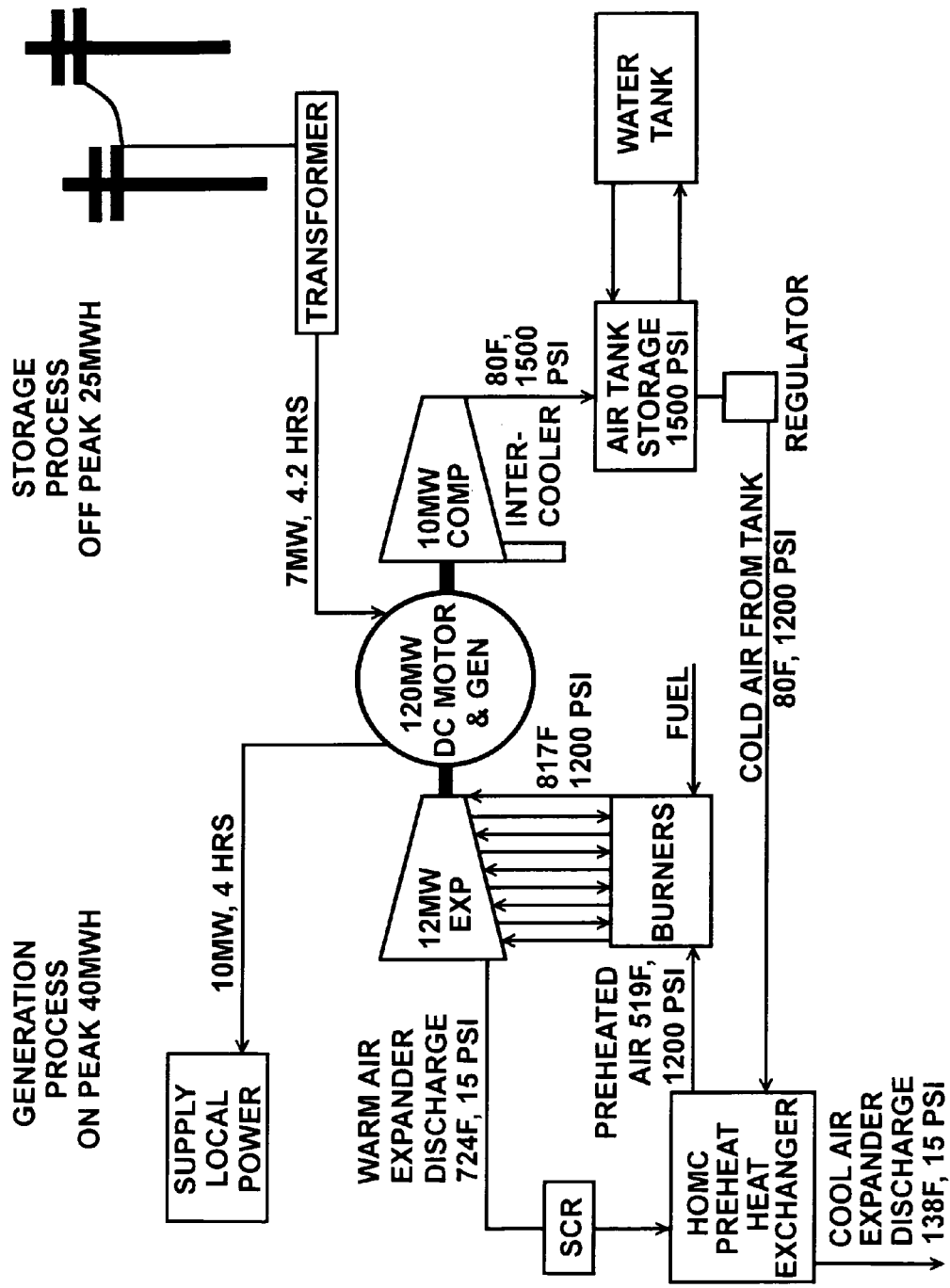
FIG. 9 is a schematic drawing of the HOMC system with direct fired burners as the heat source.

FIG. 9 is a schematic drawing showing how the HOMC cycle would operate if the heat exchangers used in the present embodiments were replaced with direct fired combustors. This allows the HOMC system to be installed without the use of waste heat. In this application, the HOMC system extracts almost all of the heat added in the combustion process by transferring most of the expander exhaust energy to the air coming from the air tank in the pre heater. While not as efficient as when it operating with waste heat (where the cost of the waste heat is considered to be zero), an HOMC operating with direct fired combustors has overall thermal cycle efficiencies approaching those of modern combined cycle power plants.

As those skilled in the art will readily appreciate from the foregoing, the use of high pressure air storage tanks in conjunction with the inter-stage reheating of the compressed air in the expansion circuit substantially reduces the required volume of the air storage, and therefore the cost of that air storage, while also making the HOMC transportable and relocatable, and avoiding the costs of acquiring land to site additional generating capacity. Likewise, the use hydraulic fluid to maintain the pressure of the compressed air in the air storage as the mass of the compressed air in the air storage is reduced during operation of the HOMC expansion cycle, also reduces the required volume of the air storage. Since the cost of the air storage is often more than half of the cost of a typical CAES system in those cases where a cavern is not available for use as air storage, the HOMC of the present invention provides energy storage and retrieval at a cost that is competitive with other options available to power authorities. When waste heat is used to heat the compressed air between expander stages during the expansion cycle, the HOMC of the present embodiment is cost-competitive as compared with other options while meeting current emissions requirements, and can provide more energy (MWh) to the electrical grid than is consumed during the storage process, where the cost of producing the waste heat is considered to be zero. In addition, the nature of the present embodiment allows it to be combined with intermittent power generation to provide electrical power in response to demand, and when combined with energy batteries, the present embodiment can provide response times similar to energy batteries for substantially longer periods of time at substantially lower costs, than using an energy battery by itself.

It should be clear that the HOMC of the present invention is useful for capturing secondary heat from many commonly available sources, as disclosed herein. Those skilled in the art will readily appreciate that the HOMC is not limited to the types of installations sites that traditional CAES systems (e.g. SmartCAES, CAES2) are restricted to due to their size. Since the HOMC of the present invention requires substantially less air storage volume than such CAES systems, the HOMC can be installed in places, (e.g. basements of buildings) to make use of secondary heat produced by the equipment already in place, to generate power that can be used by the building, its tenants, or sold to the grid.

While the invention has been described in what is known as presently the present embodiment, it is to be understood that the invention is not to be limited to the disclosed embodiment but, on the contrary, is intended to cover various modifications and equivalent arrangements within the scope of the following claims.

I claim:

1. An energy storage and retrieval system for obtaining useful work from an existing source of secondary heat, said system comprising: a source of compressed air; at least one generator; a plurality of expander stages, each of said plurality of expander stages having an inlet and an outlet, at least a portion of said plurality of expander stages having an outlet flow control, and each of said plurality of expander stages connected to said at least one generator; a first manifold; and a first plurality of heat exchangers, including an initial heat exchanger and a first plurality of downstream heat exchangers, each of said first plurality of heat exchangers having a first heat exchange circuit and a second heat exchange circuit; wherein each of said first heat exchange circuits of said first plurality of downstream heat exchangers is in selective fluid communication with one of said outlets of said plurality of expander stages through one of said outlet flow controls of said plurality of expander stages, and each of said second heat exchange circuits of said first plurality of heat exchangers is in fluid communication with said first manifold, and said first manifold is in fluid communication with said source of secondary heat to receive secondary heat therefrom.

2. The energy storage and retrieval system of claim 1 further comprising a second manifold, a pre-heater heat exchanger having a first heat exchange circuit and a second heat exchange circuit, wherein said first circuit of said pre-heater heat exchanger is in fluid communication with said second manifold and said source of compressed air, and said second heat exchange circuit of said pre-heater heat exchanger is in fluid communication with one of said outlets of said plurality of expander stages to receive said compressed air therefrom.

3. The energy storage and retrieval system of claim 2 further comprising a source of coolant with an outlet and an outlet flow control; wherein, said generator is a combined motor/generator, said source of compressed air includes an air storage, and a plurality of compressor stages driven by said motor/generator, including an initial compressor stage and a plurality of downstream compressor stages, each of said plurality of compressor stages having an inlet and an outlet, each of said plurality of downstream compressor stages having an inlet flow control, and at least a portion of said plurality of compressor stages having an outlet flow control, and a third manifold in fluid communication with said air storage, said third manifold having a plurality of inlets, each of said plurality of inlets of said third manifold having an inlet flow control, and each first heat exchange circuit of said first plurality of heat exchangers is in selective fluid communication with one of said inlets of said plurality of downstream compressor stages through one of said inlet flow controls of said plurality of downstream compressor stages, in selective fluid communication with one of said plurality of inlets of said third manifold through one of said inlet flow controls of said third manifold, and in selective fluid communication with one of said outlets of said portion of said plurality of compressor stages through one of said outlet flow controls of said portion of said plurality of compressor stages, and each second heat exchange circuit of said first plurality of heat exchangers is in selective fluid communication with said outlet of said source of coolant through said outlet flow control of said source of coolant.

4. The energy storage and retrieval system of claim 3 wherein said source of secondary heat includes an outlet and an outlet flow control, said first manifold includes a plurality of outlets and outlet flow controls, each of said inlets of said plurality of expander stages includes an inlet flow control, and each first heat exchange circuit of said first plurality of heat exchangers is in selective fluid communication with one of said inlets of said plurality of expander stages through one of said inlet flow controls of said plurality of expander stages and in selective fluid communication with said second manifold through with one of said outlet flow controls of said second manifold, and each second heat exchange circuit of said first plurality of heat exchangers is in selective fluid communication with said outlet of said source of secondary heat through said outlet flow control of said source of secondary heat.

5. The energy storage and retrieval system of claim 4 wherein each of said inlet flow controls and outlet flow controls are independently operable to provide a first operating condition in which said plurality of expander stages is fluidly isolated from said first plurality of heat exchangers and each of said first plurality of heat exchangers is in fluid communication with at least one of said plurality of compressor stages, and a second operating condition in which said plurality of compressor stages is fluidly isolated from said first plurality of heat exchangers and each of said first plurality of heat exchangers is in fluid communication with at least one of said plurality of expander stages.

6. The energy storage and retrieval system of claim 5 further including a source of hydraulic fluid, and flow control in fluid communication with said source of hydraulic fluid and said air storage for selectively permitting transfer of said hydraulic fluid into said air storage as the mass of compressed air in the air storage is reduced to maintain the pressure of said compressed air in said air storage at a predetermined level, and selectively permitting transfer of said hydraulic fluid from said air storage as the mass of said compressed air in said air storage is increased.

7. The energy storage and retrieval system of claim 6 further including a hydraulic pump in fluid communication with said source of hydraulic fluid and said air storage for pumping said hydraulic fluid into said air storage as the mass of compressed air in the air storage is reduced to maintain the pressure of said compressed air in said air storage at a predetermined level.

8. The energy storage and retrieval system of claim 6 wherein said source of secondary heat is a gas turbine.

9. The energy storage and retrieval system of claim 6 wherein said source of secondary heat is an industrial process.

10. The energy storage and retrieval system of claim 6 wherein said source of secondary heat is a steam turbine.

11. The energy storage and retrieval system of claim 6 wherein said system is modular and can be transported in preassembled components to be assembled at the site of said source of secondary heat.

12. The energy storage and retrieval system of claim 6 wherein said system is assembled on a mobile platform and transported to the site of the source of secondary heat to be connected in fluid communication with said source of secondary heat.

13. The energy storage and retrieval system of claim 6 wherein said system further includes an energy battery to provide instantaneous electrical power to provide energy at a predetermined level of power until said generator generates electrical power at said predetermined level of power.

14. The energy storage and retrieval system of claim 6 wherein said motor/generator that drives said compressor stages is powered by an intermittent power producing system.

15. The energy storage and retrieval system of claim 2 further comprising a source of coolant; a third manifold having a plurality of inlets, a fourth manifold having a plurality of outlets, a second plurality of heat exchangers, including a second plurality of upstream heat exchangers and a final heat exchanger, each of said second plurality of heat exchangers having a first heat exchange circuit and a second heat exchange circuit; wherein, said generator is a combined motor/generator, said source of compressed air includes an air storage in fluid communication with said third manifold, and a plurality of compressor stages driven by said motor/generator, including an initial compressor stage and a plurality of downstream compressor stages, each of said plurality of compressor stages having an inlet and an outlet, and a flow control controls flow into the inlet of each of said plurality of downstream compressor stages, wherein each of said first heat exchange circuits of said second plurality of upstream heat exchangers is in fluid communication with one of said outlets of said plurality of compressor stages, and each of said second heat exchange circuits of said second plurality of heat exchangers is in fluid communication with said first manifold, and said first manifold is in fluid communication with said source of secondary heat to receive secondary heat therefrom, and each first heat exchange circuit of said second plurality of heat exchangers is in selective fluid communication with one of said inlets of said plurality of downstream compressor stages through one of said flow controls that control flow into the inlet of each of said plurality of downstream compressor stages, in fluid communication with one of said plurality of inlets of said third manifold, and in fluid communication with one of said outlets of said portion of said plurality of compressor stages, and each second heat exchange circuit of said first plurality of heat exchangers is in fluid communication with said source of coolant.

16. The energy storage and retrieval system of claim 15 wherein said first manifold includes a plurality of outlets and outlet flow controls, and each first heat exchange circuit of said first plurality of heat exchangers is in fluid communication with one of said inlets of said plurality of expander stages and in selective fluid communication with said second manifold through with one of said outlet flow controls of said second manifold, and each second heat exchange circuit of said first plurality of heat exchangers is in selective fluid communication with said source of secondary heat.

17. The energy storage and retrieval system of claim 16 further including a source of hydraulic fluid, wherein said air storage is in fluid communication with said source of hydraulic fluid to allow transfer of said hydraulic fluid into said air storage as the mass of compressed air in the air storage is reduced to maintain the pressure of said compressed air in said air storage at a predetermined level and to allow transfer of said hydraulic fluid from said air storage as the mass of said compressed air in said air storage is increased.

18. The energy storage and retrieval system of claim 17 further including a hydraulic pump in fluid communication with said source of hydraulic fluid and said air storage for pumping said hydraulic fluid into said air storage as the mass of compressed air in the air storage is reduced.

19. The energy storage and retrieval system of claim 18 wherein said source of secondary heat is a gas turbine.

20. The energy storage and retrieval system of claim 18 wherein said source of secondary heat is an industrial process.

21. The energy storage and retrieval system of claim 18 wherein said source of secondary heat is a steam turbine.

22. The energy storage and retrieval system of claim 18 wherein said system is modular and can be transported in preassembled components to be assembled at the site of said source of secondary heat.

23. The energy storage and retrieval system of claim 18 wherein said system is assembled on a mobile platform and transported to the site of the source of secondary heat to be connected in fluid communication with said source of secondary heat.

24. The energy storage and retrieval system of claim 18 wherein said system further includes an energy battery to provide instantaneous electrical power to provide energy at a predetermined level of power until said generator generates electrical power at said predetermined level of power.

25. The energy storage and retrieval system of claim 18 wherein said motor/generator that drives said compressor stages is powered by an intermittent power producing system.

26. An energy storage and retrieval system for obtaining useful work from a source of heat, said system comprising: means for producing compressed air; means for storing said compressed air; means for extracting work from said compressed air including a plurality of expanders, a plurality of first conduits, and a plurality of second conduits, each of said expanders having an inlet and an outlet, each of said first conduits connected to one of said inlets of said plurality of expanders to deliver said compressed air thereto, and each of said second conduits connected to one of said outlets of said plurality of expanders to receive said compressed air therefrom; and, means for transferring energy between said compressed air and a heat transfer fluid, including a first manifold, and a first plurality of heat exchangers, including an initial heat exchanger and a plurality of downstream heat exchangers, each of said first plurality of heat exchangers having a first heat exchange circuit including a first inlet and a first outlet, and a second heat exchange circuit including a second inlet and a second outlet, each of said first outlets of said first plurality of heat exchangers connected to one of said first conduits to deliver said compressed air thereto, each of said first inlets of said plurality of downstream heat exchangers connected to one of said second conduits to receive said compressed air therefrom, and each of said second inlets of said plurality of heat exchangers connected to said first manifold; wherein said energy is heat from said source of heat, and said first manifold is connected to said source of heat to receive said heat transfer fluid therefrom for transferring said energy to said compressed air.

* * * * *